US012643348B2

(12) United States Patent (10) Patent No.: US 12,643,348 B2

Hisajima et al. (45) Date of Patent: Jun. 2, 2026

---

(54) HEAVY DUTY TIRE

(71) Applicant: Sumitomo Rubber Industries, Ltd., Kobe (JP)

(72) Inventors: Hana Hisajima, Kobe (JP); Suguru Izumo, Kobe (JP); Shuji Kagimoto, Kobe (JP); Satsuki Fujise, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/953,646

(22) Filed: Nov. 20, 2024

(65) Prior Publication Data

US 2025/0196539 A1 Jun. 19, 2025

(30) Foreign Application Priority Data

Dec. 18, 2023 (JP) ................................ 2023-213002
Apr. 1, 2024 (JP) ................................ 2024-058592
Jul. 12, 2024 (JP) ................................ 2024-112180

(51) Int. Cl.
*B60C 11/12* (2006.01)
*B60C 1/00* (2006.01)
(Continued)

(52) U.S. Cl.
CPC ........ *B60C 11/1281* (2013.01); *B60C 1/0016* (2013.01); *B60C 11/0306* (2013.01);
(Continued)

(58) Field of Classification Search
CPC ......... B60C 2011/0348; B60C 11/0306; B60C 11/04; B60C 11/1281; B60C 11/1353
See application file for complete search history.

(56) References Cited

U.S. PATENT DOCUMENTS 9,193,218 B2 * 11/2015 Tanaka ................ B60C 11/1281
2006/0169377 A1 * 8/2006 Hashimoto ......... B60C 11/1218
152/DIG. 3
(Continued)

FOREIGN PATENT DOCUMENTS

EP 4183598 A1 * 5/2023 ......... B60C 11/0323
JP 2017-94891 A 6/2017
WO WO-2014096935 A1 * 6/2014 ......... B60C 11/1281

OTHER PUBLICATIONS

Rodgers, B., Waddell, W. H. and Klingensmith, W. 2004. Rubber Compounding. Encyclopedia Of Polymer Science and Technology. John Wiley & Sons, Inc., vol. 11 (Year: 2004).*

*Primary Examiner* — Robert C Dye
(74) *Attorney, Agent, or Firm* — Birch, Stewart, Kolasch & Birch, LLP

(57) ABSTRACT

A tire 2 includes a tread 4 formed from a rubber composition containing: a rubber component including a styrene butadiene rubber; and a filler including silica. The tread 4 has a plurality of circumferential main grooves 10. The plurality of circumferential main grooves 10 define a pair of crown land portion 20 in the tread 4. Each crown land portion 20 has a crown narrow groove 24. Each crown narrow land portion 34 defined by the crown narrow groove 24 has a crown sipe 40. An amount CSB of the styrene butadiene rubber, an amount BS of the silica, a groove depth DGs of the crown sipe 40, and a groove depth DGg of the crown narrow groove 24 satisfy the following relational expression.

$$(CSB + BS)/(DGg - DGs) \geq 5$$

19 Claims, 9 Drawing Sheets

(51) Int. Cl.

| | |
|---|---|
| *B60C 11/03* | (2006.01) |
| *B60C 11/13* | (2006.01) |
| *C08K 3/04* | (2006.01) |
| *C08K 3/36* | (2006.01) |
| *C08L 7/00* | (2006.01) |
| *C08L 9/06* | (2006.01) |

(52) U.S. Cl.
CPC ...... *B60C 11/1218* (2013.01); *B60C 11/1259* (2013.01); *C08K 3/04* (2013.01); *C08K 3/36* (2013.01); *C08L 7/00* (2013.01); *C08L 9/06* (2013.01); *B60C 2011/0348* (2013.01); *B60C 2011/0353* (2013.01); *B60C 2011/0355* (2013.01); *B60C 2011/1213* (2013.01); *B60C 2200/06* (2013.01); *C08K 2201/011* (2013.01); *C08K 2201/014* (2013.01); *C08L 2205/025* (2013.01); *C08L 2205/035* (2013.01)

(56) References Cited

U.S. PATENT DOCUMENTS

| | | | | |
|---|---|---|---|---|
| 2012/0000586 A1* | 1/2012 | Kami | .................. | B60C 11/0332 |
| | | | | 152/209.18 |
| 2018/0345733 A1 | 12/2018 | Ooba | | |
| 2020/0131346 A1* | 4/2020 | Himeda | .................... | C08L 9/06 |
| 2022/0097456 A1* | 3/2022 | Ishizaka | .................. | B60C 11/24 |
| 2023/0023252 A1* | 1/2023 | Izumo | ................ | B60C 11/0323 |

\* cited by examiner

HEAVY DUTY TIRE

CROSS REFERENCE TO RELATED APPLICATION

This application claims priority on Japanese Patent Application No. 2023-213002 filed in Japan on Dec. 18, 2023, Japanese Patent Application No. 2024-58592 filed on Apr. 1, 2024 and Japanese Patent Application No. 2024-112180 filed on Jul. 12, 2024, the entire contents of which are incorporated herein by reference.

TECHNICAL FIELD

The present invention relates to heavy duty tires.

BACKGROUND ART

From the viewpoint of consideration for the environment and safety, reduction of rolling resistance and improvement of running performance on a wet road surface (hereinafter referred to as wet performance) are required.

For example, in PATENT LITERATURE 1, rolling resistance is reduced by providing projection portions projecting toward each other from land portions adjacent to each other with a circumferential groove therebetween, and wet performance is improved by providing an outside groove space on the radially outer side of the projection portions, providing an inside groove space on the radially inner side of the projection portions, and providing communication recesses that provide communication between both spaces.

CITATION LIST

Patent Literature

PATENT LITERATURE 1: Japanese Laid-Open Patent Publication No. 2017-94891

SUMMARY OF THE INVENTION

Technical Problem

An object of the present invention is to provide a heavy duty tire that can suppress a decrease in wet performance due to wear while reducing rolling resistance.

Solution to Problem

A heavy duty tire according to an aspect of the present invention includes a tread formed from a rubber composition containing: a rubber component including a styrene butadiene rubber; and a filler including silica, and the tread has a tread surface configured to come into contact with a road surface. The tread has a plurality of circumferential main grooves extending continuously in a circumferential direction. The plurality of circumferential main grooves include a crown circumferential main groove located on an equator plane and a pair of shoulder circumferential main grooves located on outermost sides in an axial direction. The plurality of circumferential main grooves define a plurality of land portions in the tread. The plurality of land portions include a pair of crown land portions closest to the equator plane and a pair of shoulder land portions including ends of the tread surface. Each of the crown land portions has a crown narrow groove extending continuously in the circumferential direction. The crown narrow groove defines two crown narrow land portions in the crown land portion. Each of the crown narrow land portions has crown sipes traversing the crown narrow land portion. The crown narrow groove includes a body portion main body and an enlarged width portion located radially inward of the body portion main body. Opposing wall surfaces of the body portion main body are brought into contact with each other by deformation of the tread. A groove width of the enlarged width portion is wider than a groove width of the body portion main body. A groove depth $DGs$ of each crown sipe is shallower than a groove depth $DGg$ of the crown narrow groove. An amount $CSB$ of the styrene butadiene rubber in 100 parts by mass of the rubber component is not less than 10 parts by mass. An amount $BS$ of the silica per 100 parts by mass of the rubber component is not less than 15 parts by mass. The amount $CSB$ of the styrene butadiene rubber, the amount $BS$ of the silica, the groove depth $DGs$ (mm) of each crown sipe, and the groove depth $DGg$ (mm) of the crown narrow groove satisfy the following relational expression.

$$(CSB + BS)/(DGg - DGs) \geq 5$$

Advantageous Effects of the Invention

The present invention can provide a heavy duty tire that can suppress a decrease in wet performance due to wear while reducing rolling resistance.

DETAILED DESCRIPTION

Figure 1:
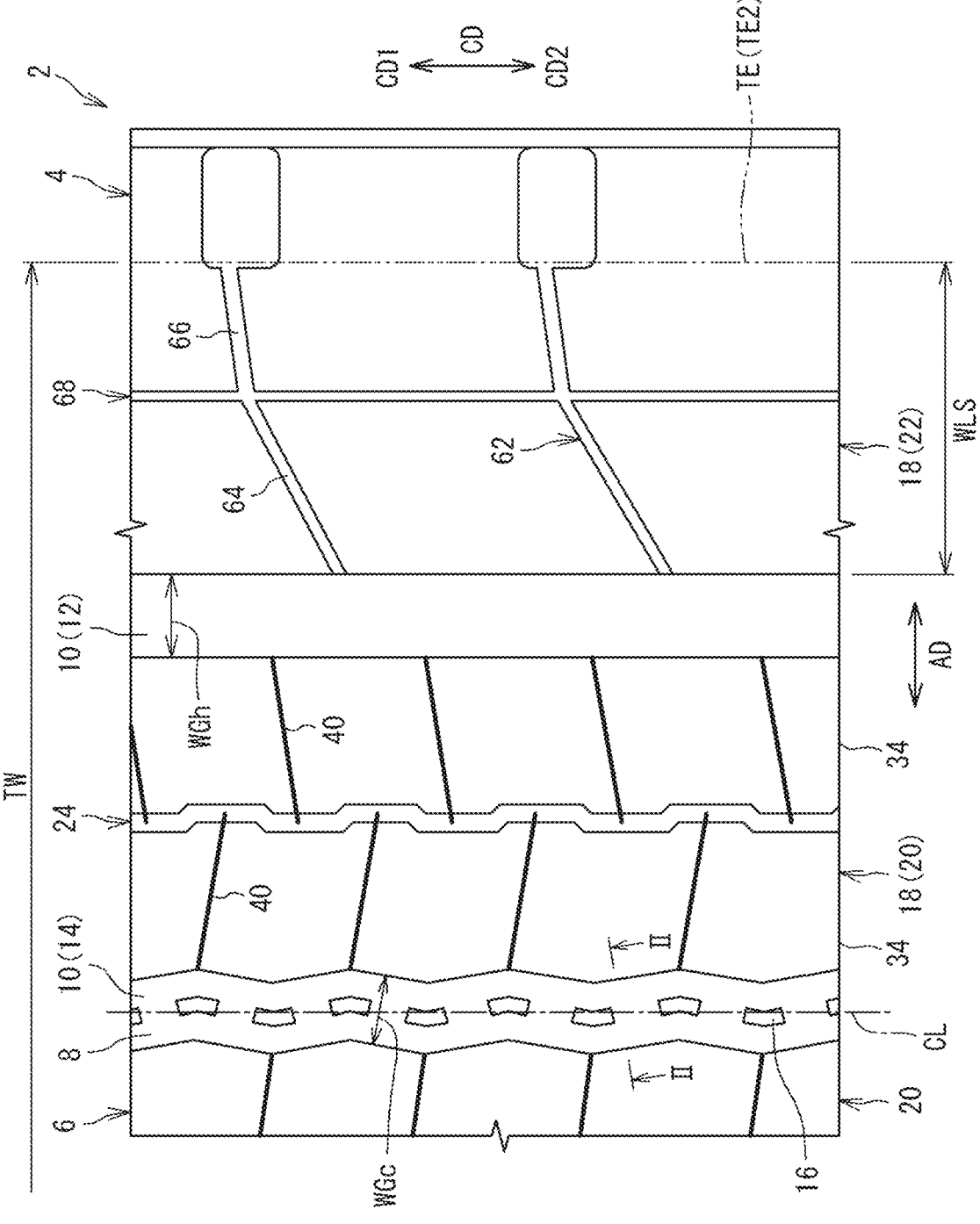
FIG. 1 is a development view showing a part of a tread of a heavy duty tire according to an embodiment of the present invention.

A tire of the present disclosure is fitted on a rim. The inside of the tire is filled with air to adjust the internal pressure of the tire. The tire fitted on the rim is also referred to as tire-rim assembly. The tire-rim assembly includes the rim and the tire fitted on the rim.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cut plane of the tire obtained by cutting the tire along a plane including a rotation axis. In this measurement, the tire is set such that the distance between right and left beads is equal to the distance between the beads in the tire that is fitted on the normal rim. The configuration of the tire that cannot be confirmed in a state where the tire is fitted on the normal rim is confirmed in the above-described cut plane.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a tread portion of the tire is a portion of the tire that comes into contact with a road surface. A bead portion is a portion of the tire that is fitted to a rim. A sidewall portion is a portion of the tire that extends between the tread portion and the bead portion. The tire includes a tread portion, a pair of bead portions, and a pair of sidewall portions as portions thereof.

A center portion of the tread portion is also referred to as crown portion. A portion of the tread portion at an end thereof is also referred to as shoulder portion.

Findings on which Present Invention is Based

A narrow groove whose wall surfaces can support each other due to deformation of a tread can effectively suppress deformation of the tread. This narrow groove is expected to be able to contribute to reduction of rolling resistance. However, the apparent stiffness of the tread increases, so that there is a concern that wet performance may decrease. Therefore, a decrease in wet performance is suppressed by providing sipes.

Thus, by providing narrow grooves and sipes, a tire is expected to be able to reduce rolling resistance while suppressing a decrease in wet performance in the initial stage of wear.

The tread becomes worn. Accordingly, the volume of grooves formed on the tread decreases. As the groove volume decreases, drainage performance decreases. Thus, when the tread becomes worn, there is a concern that wet performance may decrease. Therefore, in order to allow narrow grooves to contribute to suppressing a decrease in wet performance in the middle stage of wear, forming a radially inner portion of each narrow groove as an enlarged width portion having an enlarged groove width, that is, adopting a narrow groove having a flask-like cross-sectional shape, is under consideration.

As the tread becomes worn, the volume thereof decreases. Therefore, the apparent stiffness of the tread increases. This increase in stiffness is advantageous for rolling resistance, but disadvantageous for wet performance. Therefore, in the later stage of wear when each sipe disappears, it may be impossible to suppress a decrease in wet performance only by the exposed enlarged width portion.

Therefore, the present inventors have conducted studies focusing on the amounts of a styrene butadiene rubber and silica contained in a rubber composition for forming a tread (specifically, a cap portion) and the depths of narrow grooves and sipes, and thus have completed the invention described below.

Details of Embodiments of Present Invention

The following will describe in detail the present disclosure based on preferred embodiments with appropriate reference to the drawings.

The present disclosure is directed to a heavy duty tire including a tread formed from a rubber composition containing: a rubber component including a styrene butadiene rubber; and a filler including silica, the tread having a tread surface configured to come into contact with a road surface, wherein the tread has a plurality of circumferential main grooves extending continuously in a circumferential direction, the plurality of circumferential main grooves include a crown circumferential main groove located on an equator plane and a pair of shoulder circumferential main grooves located on outermost sides in an axial direction, the plurality of circumferential main grooves define a plurality of land portions in the tread, the plurality of land portions include a pair of crown land portions closest to the equator plane and a pair of shoulder land portions including ends of the tread surface, each of the crown land portions has a crown narrow groove extending continuously in the circumferential direction, the crown narrow groove defines two crown narrow land portions in the crown land portion, each of the crown narrow land portions has crown sipes traversing the crown narrow land portion, the crown narrow groove includes a body portion main body and an enlarged width portion located radially inward of the body portion main body, opposing wall surfaces of the body portion main body are brought into contact with each other by deformation of the tread, a groove width of the enlarged width portion is wider than a groove width of the body portion main body, a groove depth DGs of each crown sipe is shallower than a groove depth DGg of the crown narrow groove, an amount CSB of the styrene butadiene rubber in 100 parts by mass of the rubber component is not less than 10 parts by mass, an amount BS of the silica per 100 parts by mass of the rubber component is not less than 15 parts by mass, and the amount CSB of the styrene butadiene rubber, the amount BS of the silica, the groove depth DGs of each crown sipe, and the groove depth DGg of the crown narrow groove satisfy the following relational expression, $$(CSB + BS)/(DGg - DGs) \geq 5.$$

The tread of the tire becomes worn due to use. Not only in the initial stage of wear, but also in the later stage of wear when the crown sipes disappear, the tire of the present disclosure can suppress a decrease in wet performance due to wear while reducing rolling resistance. Although the mechanism by which such an effect is achieved has not been clarified, it can be inferred as follows.

When the tread surface comes into contact with a road surface, the tread becomes deformed. By this deformation, the wall surfaces of the crown narrow groove are brought into contact with each other at the body portion main body. The crown narrow land portions located on both sides of the crown narrow groove support each other. Deformation of the crown land portion is suppressed. The body portion main body can contribute to reduction of rolling resistance. The apparent stiffness of the crown land portion is increased. There is a concern about a decrease in wet performance. However, the crown sipes suppress a decrease in wet performance. Thus, it is inferred that in the initial stage of wear, the tire can suppress a decrease in wet performance due to wear while reducing rolling resistance.

As the wear of the tread proceeds, the groove volume of the circumferential main grooves, etc., decreases. There is a concern about a decrease in wet performance. However, the enlarged width portion having a groove width wider than the groove width of the body portion main body is located radially inward of the body portion main body. When the body portion main body disappears, the enlarged width portion is exposed. The enlarged width portion can contribute to suppressing a decrease in wet performance. The volume of the tread decreases due to wear. The deformation allowance of the tread is reduced, and thus the apparent stiffness of the tread is increased. The increase in stiffness can contribute to reduction of rolling resistance. Thus, it is inferred that in the middle stage of wear, the tire can suppress a decrease in wet performance due to wear while reducing rolling resistance.

As the wear of the tread proceeds further, the volume of the tread decreases further. The apparent stiffness of the tread is increased further. The increase in stiffness is advantageous for rolling resistance, but disadvantageous for wet performance. In the later stage of wear when the crown sipes disappear, the enlarged width portion remains, but it may be impossible for the tire to suppress a decrease in wet performance.

However, the rubber composition for forming the tread of the tire contains a styrene butadiene rubber and silica. The glass transition temperature (Tg) of the rubber component is increased. A road surface following property in a micro-deformation region is improved. Regardless of the stage of wear, the tread can contribute to improvement of wet performance. In particular, since the amount of the styrene butadiene rubber, the amount of the silica, and the groove depths of the crown narrow groove and each crown sipe are set so as to satisfy the above-described relational expression, a decrease in wet performance is suppressed even in the later stage of wear due to the synergistic effect of the styrene butadiene rubber and the silica. The tire can suppress a decrease in wet performance, while maintaining low rolling resistance, from the time when the use of the tire is started until the tire needs to be replaced.

According to the present disclosure, a tire that can suppress a decrease in wet performance due to wear while reducing rolling resistance, is obtained.

Preferably, the rubber component further includes a natural rubber and a butadiene rubber, and the amount CSB of the styrene butadiene rubber, an amount CN of the natural rubber, and an amount CB of the butadiene rubber in 100 parts by mass of the rubber component satisfy the following relational expression, $$CN \geq CSB + CB.$$

It is inferred that when the rubber component further includes a natural rubber (hereinafter referred to as NR) and a butadiene rubber (hereinafter referred to as BR) so as to satisfy the above-described relational expression, the dispersibility of the silica in the rubber composition is enhanced while the durability of the tread is maintained. In this case, it is inferred that the tire can suppress a decrease in wet performance due to wear while reducing rolling resistance.

Preferably, an amount CS of the silica in 100 parts by mass of the filler is not less than 40 parts by mass. This is because the tread can further enhance a road surface following property in a micro-deformation region, and the tire can improve wet performance regardless of the stage of wear.

Preferably, the silica includes silica made from a biomass material. This is because such silica can contribute to reduction of environmental load.

Preferably, the filler includes silica having an average primary particle diameter of not greater than 16 nm. This is because such silica can contribute to improvement of wear resistance and durability.

Preferably, the filler further includes carbon black, and the carbon black includes recycled carbon black. This is because the recycled carbon black can contribute to reduction of environmental load, and is expected to be able to reduce friction between the surface thereof and a rubber molecular chain to suppress heat generation.

Preferably, the filler further includes carbon black, and the carbon black includes carbon black having an average primary particle diameter of not greater than 19 nm. This is because such carbon black can contribute to improvement of wear resistance and durability.

Preferably, the rubber composition further contains a resin component. This is because the resin component can contribute to improvement of wet performance.

Preferably, a land ratio defined below is not less than 80%. In this case, the land portions easily support each other, so that the stiffness of the tread is effectively increased. The tire can effectively reduce rolling resistance and can also improve wear resistance. In particular, in the case where the filler includes silica, there is a concern that the stiffness of the tread may be lower than when the entire filler is composed of carbon black, but when the land ratio is set be not less than 80%, the tread can maintain its stiffness to the required degree.

Land ratio: a ratio of a total area value of ground-contact surfaces of a plurality of land portions included in a ground-contact surface to an area value of an entirety of the ground-contact surface, the ground-contact surface being obtained by: applying a load, which is 100% of a normal load, to the tire, which is fitted on a normal rim and whose internal pressure is adjusted to a normal internal pressure, with a camber angle as 0 degrees; and bringing the tire into contact with a flat road surface.

Preferably, each crown sipe extends in a zigzag manner in a longitudinal direction and a depth direction thereof. Accordingly, when the tread is deformed and the wall surfaces of the crown sipe come into close contact with each other, the wall surfaces constrain each other, so that the stiffness of the tread is effectively increased. The tire can effectively reduce rolling resistance and can also improve wear resistance. In this case as well, especially in the case where the filler includes silica, there is a concern that the stiffness of the tread may be lower than when the entire filler is composed of carbon black, but when each crown sipe is composed of a three-dimensional sipe extending in a zigzag manner in the longitudinal direction and the depth direction thereof, the tread can maintain its stiffness to the required degree.

Preferably, the crown narrow groove includes inner crown narrow grooves close to the equator plane, outer crown narrow grooves close to the end of the tread surface, and connection crown narrow grooves connecting the inner crown narrow grooves and the outer crown narrow grooves, and the inner crown narrow grooves and the outer crown narrow grooves are arranged alternately in the circumferential direction. As described above, when a force acts on the tread and the tread is deformed, the wall surfaces of the crown narrow groove come into contact with each other at the body portion main body thereof. Since the crown narrow groove extends in the circumferential direction while meandering, the wall surfaces thereof effectively engage each other. The crown narrow land portions located on both sides of the crown narrow groove constrain each other. The apparent stiffness of the crown land portion is increased. Deformation of the crown land portion is effectively suppressed. The tire can effectively reduce rolling resistance and can also improve wear resistance. In this case as well, especially in the case where the filler includes silica, there is a concern that the stiffness of the tread may be lower than when the entire filler is composed of carbon black, but when the crown narrow groove includes inner crown narrow grooves, outer crown narrow grooves, and connection crown narrow grooves, and the inner crown narrow grooves and the outer crown narrow grooves are arranged alternately in the circumferential direction, the tread can maintain its stiffness to the required degree.

Thus, the heavy duty tire of the present disclosure can suppress a decrease in wet performance due to wear while reducing rolling resistance.

[Rubber Composition]

The tread is formed from a rubber composition. The tread is a crosslinked product of the rubber composition. The following will describe the rubber composition for the tread. The rubber composition contains a rubber component and a filler.

[Rubber Component]

The rubber component includes a styrene butadiene rubber (hereinafter referred to as SBR). The rubber component includes an SBR, and may further include a rubber component other than the SBR, or may be composed of only the SBR.

[SBR]

The SBR is not particularly limited, and examples of the SBR include solution-polymerized SBRs (S-SBRs), emulsion-polymerized SBRs (E-SBRs), and modified SBRs thereof (modified S-SBRs and modified E-SBRs). Examples of modified SBRs include modified SBRs in which the terminals and/or the main chain thereof is modified, and modified SBRs coupled by using tin, a silicon compound, or the like (a condensate, one having a branch structure, etc.). Among them, S-SBRs and modified SBRs are preferable as SBRs included in the rubber component. Furthermore, hydrogenated products of these SBRs (hydrogenated SBRs), etc., can also be used as SBRs in this rubber composition. One of these SBRs may be selected and used alone, or two or more of these SBRs may be selected and used in combination.

The SBR has excellent viscoelastic properties in a region highly correlated with wet performance (specifically, grip performance on a wet road surface), and has excellent compatibility and reactivity with silica described later. The SBR is considered to be able to contribute to improvement of wet performance and wear resistance.

From the viewpoint of being able to contribute to improvement of wet performance and wear resistance, the styrene content of the SBR is preferably not less than 5% by mass, more preferably not less than 7% by mass, and further preferably not less than 9% by mass. The styrene content of the SBR is preferably not greater than 24% by mass, more preferably not greater than 18% by mass, and further preferably not greater than 16% by mass. The styrene content of the SBR is calculated by 1H-NMR measurement.

The vinyl content of the SBR is not less than 26% by mole. This is because, if the vinyl content is less than 26% by mole, it is difficult to improve wet performance and wear resistance to the degree required for tire performance. The vinyl content is preferably not less than 27% by mole, more preferably not less than 28% by mole, further preferably not less than 29% by mole, and particularly preferably not less than 30% by mole. The vinyl content of the SBR is preferably not greater than 45% by mole, more preferably not greater than 44% by mole, further preferably not greater than 43% by mole, and particularly preferably not greater than 42% by mole. The vinyl content (1,2-bond butadiene unit content) of the SBR is measured by infrared absorption spectrometry.

From the viewpoint of improving wet performance, the glass transition temperature (Tg) of the SBR is preferably not lower than $-80°$ C., more preferably not lower than $-70°$ C., and further preferably not lower than $-65°$ C. From the viewpoint of reducing rolling resistance, the Tg of the SBR is preferably not higher than $-40°$ C., more preferably not higher than $-45°$ C., further preferably not higher than $-50°$ C., and particularly preferably not higher than $-55°$ C. The Tg of the SBR is obtained by performing differential scanning calorimetry (DSC) in accordance with JIS K7121 for "pure SBR content" obtained by removing elongation oil using acetone in accordance with JIS K6229.

From the viewpoint of improving wear resistance, the weight-average molecular weight (Mw) of the SBR is preferably not less than 100 thousand, more preferably not less than 150 thousand, and further preferably not less than 190 thousand. From the viewpoint of crosslinking uniformity, etc., the Mw of the SBR is preferably not greater than 2.5 million, more preferably not greater than 2 million, and further preferably not greater than 1 million. The Mw of the SBR can be obtained by conversion, based on a polystyrene standard, of a value measured by gel permeation chromatography (GPC) (e.g., GPC-8000 series manufactured by Tosoh Corporation, detector: differential refractometer, column: TSKGEL SUPERMULTIPORE HZ-M manufactured by Tosoh Corporation).

As described above, the amount CSB of the SBR in 100 parts by mass of the rubber component is not less than 10 parts by mass. The SBR can effectively contribute to improvement of wear resistance and wet performance. From this viewpoint, the amount CSB is preferably not less than 15 parts by mass, more preferably not less than 17 parts by mass, and further preferably not less than 19 parts by mass. From the viewpoint of maintaining good wear resistance, the amount CSB is preferably not greater than 60 parts by mass, more preferably not greater than 40 parts by mass, and further preferably not greater than 25 parts by mass.

As described above, the rubber component can include another rubber component other than the SBR. As the other rubber component other than the SBR, a crosslinkable rubber component that is generally used in the tire industry can be used. Examples of such a rubber component include isoprene-based rubber, butadiene rubber (BR), styrene-iso-prene-butadiene copolymer rubber (SIBR), styrene-isobuty-lene-styrene block copolymer (SIBS), chloroprene rubber (CR), acrylonitrile-butadiene rubber (NBR), hydrogenated nitrile rubber (HNBR), butyl rubber (IIR), ethylene-propyl-ene rubber, polynorbornene rubber, silicone rubber, poly-ethylene chloride rubber, fluororubber (FKM), acrylic rub-ber (ACM), and hydrin rubber. One of these other rubber components may be selected and used alone, or two or more of these other rubber components may be selected and used in combination.

The rubber component of the rubber composition for the tread preferably includes an isoprene-based rubber and a BR as rubber components other than the SBR.

[Isoprene-Based Rubber]

Examples of the isoprene-based rubber include natural rubber (NR), polyisoprene rubber (IR), reformed NR, modi-fied NR, and modified IR. As the NR, for example, NRs that are generally used in the tire industry, such as SIR20, RSS #3, and TSR20, can be used. The IR is not particularly limited, and, as the IR, for example, IRs that are generally used in the tire industry, such as IR2200, can be used. Examples of the reformed NR include deproteinized natural rubber (DPNR) and ultra-pure natural rubber (UPNR), examples of the modified NR include epoxidized natural rubber (ENR), hydrogenated natural rubber (HNR), and grafted natural rubber, and examples of the modified IR include epoxidized isoprene rubber, hydrogenated isoprene rubber, and grafted isoprene rubber. These rubbers may be used individually, or two or more of these rubbers may be used in combination. Among them, NR is preferable. The rubber component of the rubber composition for the tread preferably includes an NR and a BR as rubber components other than the SBR.

In the case where the rubber component includes an NR, from the viewpoint of increasing the strength of the tread and improving wear resistance, the amount CN of the NR in 100 parts by mass of the rubber component is preferably not less than 30 parts by mass, more preferably not less than 45 parts by mass, and further preferably not less than 55 parts by mass. The amount CN is preferably not greater than 80 parts by mass, more preferably not greater than 70 parts by mass, and further preferably not greater than 65 parts by mass.

[Butadiene Rubber]

The butadiene rubber (BR) is not particularly limited, and, for example, BRs that are generally used in the tire industry, such as a BR having a cis content of less than 50% by mass (low-cis BR), a BR having a cis content of not less than 90% by mass (high-cis BR), a rare-earth element-based butadiene rubber synthesized using a rare-earth element-based catalyst (rare-earth element-based BR), a BR containing syndiotactic polybutadiene crystals (SPB-containing BR), and modified BRs (high-cis modified BR, low-cis modified BR), can be used. These BRs may be used individually, or two or more of these BRs may be used in combination. The cis content of the BR is a value calculated by infrared absorption spectrometry.

In the case where the rubber component includes a BR, from the viewpoint of improving wear resistance, the amount CB of the BR in 100 parts by mass of the rubber component is preferably not less than 5 parts by mass and more preferably not less than 15 parts by mass. The amount CB of the BR is preferably not greater than 40 parts by mass and more preferably not greater than 25 parts by mass.

In the case where the rubber component further includes an NR and a BR in addition to the SBR, as described above, the amount CN of the NR is preferably equal to the sum of the amount CSB of the SBR and the amount CB of the BR or larger than the sum of the amount CSB of the SBR and the amount CB of the BR. This is because the dispersibility of silica in the rubber composition is enhanced while the durability of the tread is maintained. In this case, it is inferred that the tire can suppress a decrease in wet perfor-mance due to wear while reducing rolling resistance. From this viewpoint, the amount CN of the NR is more preferably larger than the sum of the amount CSB of the SBR and the amount CB of the BR. In other words, the amount CN of the NR, the amount CSB of the SBR, and the amount CB of the BR more preferably satisfy the following relational expres-sion.

$$CN > CSB + CB$$

[Filler]

As described above, the rubber composition for the tread contains a filler, and the filler includes silica. In other words, the rubber composition contains silica as a filler. The filler more preferably includes carbon black and silica, and may include only carbon black and silica. In other words, the rubber composition more preferably contains carbon black and silica as a filler, and the filler may be composed of only carbon black and silica.

[Silica]

The silica is not particularly limited, and silicas that are generally used in the tire industry, such as silica prepared by a dry process (anhydrous silica) and silica prepared by a wet process (hydrous silica), can be used. From the viewpoint of environmental load, silica made from a biomass material (e.g., amorphous silica purified from rice husks) may also be used as described above. Among them, hydrous silica pre-pared by a wet process is preferable for the reason that it has a higher silanol group content. These silicas may be used individually, or two or more of these silicas may be used in combination.

Silica made from a biomass material can be obtained, for example, by: extracting silicate from rice husk ashes obtained by burning rice husks, with a sodium hydroxide solution; using the silicate to react with sulfuric acid in the same way as conventional wet silica; and then filtering, washing with water, drying, and pulverizing the precipitated silicon dioxide produced.

It should be noted that when silica crystallizes, the silica is insoluble in water, and silicic acid, which is a component of the silica, cannot be utilized. The crystallization of silica in the rice husk ash can be suppressed by controlling the combustion temperature and the combustion time (see Japa-nese Laid-Open Patent Publication No. 2009-2594, Akita Prefectural University Web Journal B/2019, vol. 6, p. 216-222, etc.).

The amorphous silica extracted from rice husks may be ones commercially available from Wilmar International Limited, etc.

From the viewpoint of improving wear resistance and durability, the average primary particle diameter of the silica is preferably not greater than 22 nm, more preferably not greater than 19 nm, and further preferably not greater than 16 nm. The average primary particle diameter is preferably not less than 6 nm, more preferably not less than 9 nm, and further preferably not less than 12 nm.

The average primary particle diameter of the silica can be obtained by observing the silica with a transmission or scanning electron microscope, measuring the outer diameters of 400 or more primary particles of the silica observed in the field of view, and averaging these outer diameters.

From the viewpoint of improving wear resistance and durability, the nitrogen adsorption specific surface area $(N_2SA)$ of the silica is preferably not less than 100 $m^2/g$, more preferably not less than 110 $m^2/g$, and further preferably not less than 120 $m^2/g$. This nitrogen adsorption specific surface area is preferably not greater than 500 $m^2/g$, more preferably not greater than 350 $m^2/g$, and further preferably not greater than 250 $m^2/g$.

The nitrogen adsorption specific surface area $(N_2SA)$ of the silica is measured by the BET method according to ASTM D3037-93.

The amount BS of the silica per 100 parts by mass of the rubber component is not less than 15 parts by mass. The silica can effectively reinforce the tread. Since the stiffness of the tread is increased, wear resistance and durability are improved. From this viewpoint, the amount BS of the silica is preferably not less than 17 parts by mass, more preferably not less than 19 parts by mass, and further preferably not less than 20 parts by mass. From the viewpoint of being able to obtain flexibility to alleviate stress, the amount BS of the silica is preferably not greater than 70 parts by mass, more preferably not greater than 50 parts by mass, and further preferably not greater than 35 parts by mass.

[Carbon Black]

The carbon black is not particularly limited, and, for example, carbon blacks that can be generally used in the tire industry, such as GPF, FEF, HAF, ISAF, and SAF, can be used. In addition, from the viewpoint of reducing environmental load and from the viewpoint of being able to reduce friction between the carbon black surface and a rubber molecular chain to suppress heat generation, recycled carbon black (rCB) obtained from the pyrolysis of used tires can also be used for the tire. These carbon blacks may be used individually, or two or more of these carbon blacks may be used in combination In the present disclosure, to distinguish from recycled carbon black (rCB), the above-described carbon blacks that can be generally used in the tire industry, such as GPF, FEF, HAF, ISAF, and SAF, are also referred to as standard carbon black (sCB).

Recycled carbon black can be obtained from the pyrolysis process of used pneumatic tires, as described above. For example, European Patent Application Publication No. 3427975 refers to "Rubber Chemistry and Technology", Vol. 85, No. 3, pages 408-449 (2012), especially pages 438, 440, and 442, and states that recycled carbon black can be obtained by pyrolysis of organic materials at 550 to 800° C. with exclusion of oxygen, or by vacuum pyrolysis at relatively low temperatures ([0027]). Carbon blacks obtained from such pyrolysis processes usually lack functional groups on the surfaces thereof, as mentioned in of Japanese Patent No. 6856781 (A Comparison of Surface Morphology And Chemistry of Pyrolytic Carbon Blacks with Commercial Carbon Blacks, Powder Technology 160 (2005) 190-193).

The recycled carbon black may lack functional groups on the surface thereof or may be treated so as to include functional groups on the surface thereof. The treatment to be performed so as to include functional groups on the surface of the recycled carbon black can be carried out by ordinary methods. For example, in European Patent Application Publication No. 3173251, carbon black obtained from a pyrolysis process is treated with potassium permanganate under acidic conditions to obtain carbon black containing hydroxyl and/or carboxyl groups on the surface thereof.

Also, in Japanese Patent No. 6856781, carbon black obtained from a pyrolysis process is treated with an amino acid compound containing at least one thiol or disulfide group to obtain carbon black whose surface has been activated. The recycled carbon black according to the present embodiment also includes carbon black that has been treated so as to include functional groups on the surface thereof.

As the recycled carbon black, recycled carbon blacks commercially available from Strebl Green Carbon Pte Ltd, LDCarbon, etc., can be used.

From the viewpoint of improving wear resistance and durability, the average primary particle diameter of the carbon black is preferably not greater than 25 nm, more preferably not greater than 22 nm, and further preferably not greater than 19 nm. The average primary particle diameter is preferably not less than 6 nm, more preferably not less than 9 nm, and further preferably not less than 12 nm.

The average primary particle diameter of the carbon black can be obtained by observing the carbon black with a transmission or scanning electron microscope, measuring the outer diameters of 400 or more primary particles of the carbon black observed in the field of view, and averaging these outer diameters.

From the viewpoint of improving wear resistance and durability, the nitrogen adsorption specific surface area $(N_2SA)$ of the carbon black is preferably not less than 10 $m^2/g$, more preferably not less than 20 $m^2/g$, and further preferably not less than 30 $m^2/g$. This nitrogen adsorption specific surface area $(N_2SA)$ is preferably not greater than 250 $m^2/g$, more preferably not greater than 200 $m^2/g$, and further preferably not greater than 150 $m^2/g$. The nitrogen adsorption specific surface area $(N_2SA)$ of the carbon black is measured according to JIS K6217-2:2017.

In the case where the rubber composition contains carbon black, from the viewpoint of exhibiting reinforcing action and the viewpoint of preventing deterioration due to UV light, an amount BC of the carbon black per 100 parts by mass of the rubber component is preferably not less than 5 parts by mass, more preferably not less than 15 parts by mass, and further preferably not less than 25 parts by mass. From the viewpoint that the tread can obtain flexibility to alleviate stress, the amount BC is preferably not greater than 70 parts by mass, more preferably not greater than 60 parts by mass, and further preferably not greater than 50 parts by mass.

The amount of the recycled carbon black in 100 parts by mass of the carbon black is not particularly limited, and can be, for example, greater than 1 part by mass, greater than 5 parts by mass, greater than 10 parts by mass, greater than 20 parts by mass, greater than 25 parts by mass, or greater than 30 parts by mass. From the viewpoint of exhibiting the reinforcing action of the carbon black, the amount of the recycled carbon black is preferably less than 95 parts by mass, more preferably less than 90 parts by mass, and further preferably less than 85 parts by mass.

[Other Fillers]

As fillers other than the silica and the carbon black, fillers that are generally used in the tire industry, such as aluminum hydroxide, calcium carbonate, alumina, clay, and talc, can be blended.

From the viewpoint that the tread can further improve a road surface following property in a micro-deformation region and the tire can improve wet performance regardless of the stage of wear, the amount CS of the silica in 100 parts by mass of the filler is preferably not less than 20 parts by mass, more preferably not less than 30 parts by mass, and further preferably not less than 40 parts by mass. The amount CS is preferably not greater than 95 parts by mass, more preferably not greater than 80 parts by mass, and further preferably not greater than 65 parts by mass.

From the viewpoint of improving wear resistance and durability, the total amount of the fillers per 100 parts by mass of the rubber component is preferably not less than 45 parts by mass, more preferably not less than 50 parts by mass, and further preferably not less than 55 parts by mass. From the viewpoint that the tread can obtain flexibility to alleviate stress, the total amount of the fillers is preferably not greater than 80 parts by mass, more preferably not greater than 70 parts by mass, and further preferably not greater than 65 parts by mass.

[Silane Coupling Agent]

As described above, the rubber composition contains silica as a filler. The silica is preferably used in combination with a silane coupling agent. The silane coupling agent is not particularly limited, and any silane coupling agent that is conventionally used in combination with silica in the tire industry can be used. Examples of the silane coupling agent include: mercapto-based silane coupling agents such as 3-mercaptopropyltrimethoxysilane and NXT-Z100, NXT-Z45, and NXT manufactured by Momentive Performance Materials, Inc.; sulfide-based silane coupling agents such as bis(3-triethoxysilylpropyl) disulfide and bis(3-triethoxysilylpropyl) tetrasulfide; thioester-based coupling agents such as 3-octanoylthio-1-propyltriethoxysilane, 3-hexanoylthio-1-propyltriethoxysilane, and 3-octanoylthio-1-propyltrimethoxysilane; vinyl-based silane coupling agents such as vinyltriethoxysilane and vinyltrimethoxysilane; amino-based silane coupling agents such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; and chloro-based silane coupling agents such as 3-chloropropyltrimethoxysilane and 3-chloropropyltriethoxysilane. Among them, sulfide-based silane coupling agents and/or mercapto-based silane coupling agents are preferable, and sulfide-based silane coupling agents are more preferable. One of these silane coupling agents may be used alone, or two or more of these silane coupling agents may be used in combination.

From the viewpoint of enhancing the dispersibility of the silica, the amount of the silane coupling agent per 100 parts by mass of the rubber component is preferably not less than 0.5 parts by mass, more preferably not less than 1.0 part by mass, further preferably not less than 2.0 parts by mass, and particularly preferably not less than 4.0 parts by mass. From the viewpoint of suppressing a decrease in wear resistance, the amount of the silane coupling agent is preferably not greater than 20 parts by mass, more preferably not greater than 15 parts by mass, and further preferably not greater than 10 parts by mass.

From the viewpoint of enhancing the dispersibility of the silica, the amount of the silane coupling agent per 100 parts by mass of the silica is preferably not less than 1 part by mass, more preferably not less than 3 parts by mass, further preferably not less than 5 parts by mass, and particularly preferably not less than 8 parts by mass. From the viewpoint of reduction of cost and improvement of processability, the amount of the silane coupling agent is preferably not greater than 20 parts by mass, more preferably not greater than 18 parts by mass, and further preferably not greater than 16 parts by mass.

[Other Ingredients]

In addition to the above components, the rubber composition according to the present embodiment can contain ingredients that are conventionally and generally used in the tire industry, such as a softener, wax, stearic acid, zinc oxide, an antioxidant, a vulcanizing agent, and a vulcanization accelerator, as appropriate.

Examples of the softener include a resin component, an oil, and a liquid rubber.

The resin component that can be used in the present embodiment is not particularly limited, resins that are commonly used in the tire industry can be used, and examples of such resins include adhesive resins such as C9-based resins, C5-based resins, C5C9-based resins, dicyclopentadiene-based resins, aromatic vinyl-based resins, coumarone-based resins, indene-based resins, terpene-based resins, rosin-based resins, and phenol-based resins. One of these resin components may be used alone, or two or more of these resin components may be used in combination.

C9-based resins refer to resins obtained by polymerizing C9 fractions, and may be resins obtained by polymerizing C9 fractions alone, or may be copolymers obtained by copolymerizing C9 fractions and other components. For example, a resin obtained by copolymerizing dicyclopentadiene (DCPD) and a C9 fraction is referred to as DCPD/C9 resin. These resins may also be hydrogenated or modified. Examples of C9 fractions include petroleum fractions having 8 to 10 carbon atoms such as vinyltoluene, alkylstyrene, coumarone, indene, methylindene, and dicyclopentadiene. One of these C9-based resins may be used alone, or two or more of these C9-based resins may be used in combination.

C5-based resins refer to resins obtained by polymerizing C5 fractions, and these resins may be hydrogenated or modified. Examples of C5 fractions other than dicyclopentadiene include petroleum fractions having 4 to 5 carbon atoms such as cyclopentadiene, isoprene, pentane, isopentane, neopentane, pentene, and pentadiene. One of these C5-based resins may be used alone, or two or more of these C5-based resins may be used in combination.

C5C9-based resins refer to resins obtained by copolymerizing the C5 fractions and the C9 fractions, and these resins may be hydrogenated or modified. As C5C9-based petroleum resins, for example, products commercially available from Tosoh Corporation, Zibo Luhua Hongjin New Material Group Co., Ltd., etc., can be used. One of these C5C9-based resins may be used alone, or two or more of these C5C9-based resins may be used in combination.

Dicyclopentadiene-based resins refer to resins containing cyclopentadiene (CPD) or dicyclopentadiene (DCPD) as a monomer component, and these resins may be hydrogenated or modified. Examples of dicyclopentadiene-based resins include DCPD/C9 resins containing dicyclopentadiene and the C9 fractions as monomer components (the DCPD/C9 resins may be hydrogenated or modified). DCPD/C9 resins containing dicyclopentadiene and styrene as monomer components are preferable, and DCPD/C9 resins containing dicyclopentadiene, styrene, and indene as monomer components are particularly preferable. As dicyclopentadiene-based resins, for example, products commercially available from Exxon Mobil Corporation, ENEOS Corporation, Zeon Corporation, Maruzen Petrochemical Co., Ltd., etc., can be used. One of these dicyclopentadiene-based resins may be used alone, or two or more of these dicyclopentadiene-based resins may be used in combination.

Aromatic vinyl-based resins refer to resins each containing an aromatic vinyl compound such as styrene, α-methylstyrene, vinyltoluene, and p-chlorostyrene as a monomer component whose amount is the largest, and these resins may be hydrogenated or modified. As an aromatic vinyl-based resin, a homopolymer of α-methylstyrene or styrene or a copolymer of α-methylstyrene and styrene is preferable, and a copolymer of α-methylstyrene and styrene is more preferable, for the reasons that the polymer is economic, is easily processed, and has excellent heat generation properties. As aromatic vinyl-based resins, for example, products commercially available from Kraton Corporation, Eastman Chemical Company, Mitsui Chemicals, Inc., etc., can be used. One of these aromatic vinyl-based resins may be used alone, or two or more of these aromatic vinyl-based resins may be used in combination.

Coumarone-based resins refer to resins containing coumarone as a monomer component, and these resins may be hydrogenated or modified. Examples of coumarone-based resins include coumarone-indene resins containing coumarone and indene as monomer components, and coumarone-indene-styrene resins containing coumarone, indene, and styrene as monomer components. One of these coumarone-based resins may be used alone, or two or more of these coumarone-based resins may be used in combination.

Indene-based resins refer to resins containing indene as a monomer component, and these resins may be hydrogenated or modified. Examples of indene-based resins include coumarone-indene resins containing coumarone and indene as monomer components, and coumarone-indene-styrene resins containing coumarone, indene, and styrene as monomer components. One of these indene-based resins may be used alone, or two or more of these indene-based resins may be used in combination.

Terpene-based resins refer to resins each containing a terpene compound such as α-pinene, β-pinene, limonene, and dipentene as a monomer component whose amount is the largest, and these resins may be hydrogenated or modified. Specific examples of terpene-based resins include: polyterpene resins each containing one or more of the terpene compounds alone as a monomer component; aromatic modified terpene resins each containing the terpene compound and an aromatic compound as monomer components; and terpene-phenol resins each containing the terpene compound and a phenol-based compound as monomer components. Examples of aromatic compounds as monomer components of aromatic modified terpene resins include styrene, α-methylstyrene, vinyltoluene, and divinyltoluene. Examples of phenol-based compounds as monomer components of terpene-phenol resins include phenol, bisphenol A, cresol, and xylenol. One of these terpene-based resins may be used alone, or two or more of these terpene-based resins may be used in combination.

Rosin-based resins refer to resins containing rosin acid compounds such as abietic acid, neoabietic acid, palustric acid, and isopimaric acid, and these resins may be hydrogenated or modified. The rosin-based resins are not particularly limited, and examples of the rosin-based resins include natural rosin resins, and rosin-modified resin modified by hydrogenation, disproportionation, dimerization, esterification, etc. One of these rosin-based resins may be used alone, or two or more of these rosin-based resins may be used in combination.

Phenol-based resins refer to resins each containing a phenol compound such as phenol and cresol as a monomer component whose amount is the largest. The phenol-based resins are not particularly limited, and examples of the phenol-based resins include phenol formaldehyde resins, alkylphenol formaldehyde resins, alkylphenol acetylene resins, and oil-modified phenol formaldehyde resins. One of these phenol-based resins may be used alone, or two or more of these phenol-based resins may be used in combination.

From the viewpoint of wet performance, the softening point of the resin component is preferably not lower than 80° C., more preferably not lower than 90° C., and further preferably not lower than 100° C. From the viewpoint of processability and improvement of the dispersibility of the rubber component and the fillers, the softening point of the resin component is preferably not higher than 150° C., more preferably not higher than 140° C., and further preferably not higher than 130° C. The softening point of the resin is a temperature that is measured with a ring and ball softening point measuring device according to 7.7 in JIS K 6220-1: 2015 and at which a ball has descended.

In the case where the rubber composition contains a resin component, from the viewpoint of wet performance, the amount of the resin component per 100 parts by mass of the rubber component is preferably not less than 1 part by mass, more preferably not less than 3 parts by mass, and further preferably not less than 5 parts by mass. From the viewpoint of suppression of heat generation, the amount of the resin component is preferably not greater than 60 parts by mass, more preferably not greater than 50 parts by mass, further preferably not greater than 40 parts by mass, and particularly preferably not greater than 30 parts by mass.

Examples of the oil include process oils, vegetable fats and oils, and animal fats and oils. Examples of the process oils include paraffin-based process oils, naphthene-based process oils, and aroma-based process oils. In addition, a process oil that has a low content of a polycyclic aromatic (PCA) compound and for which environmental impact is taken into consideration can also be used. Examples of the low PCA content process oil include a mild extraction solvate (MES), a treated distillate aromatic extract (TDAE), and a heavy naphthenic oil.

In the case where the rubber composition contains an oil, from the viewpoint of improving processability, the amount of the oil per 100 parts by mass of the rubber component is preferably not less than 1 part by mass, more preferably not less than 3 parts by mass, and further preferably not less than 5 parts by mass. From the viewpoint of improving wear resistance, the amount of the oil is preferably not greater than 90 parts by mass, more preferably not greater than 70 parts by mass, further preferably not greater than 50 parts by mass, and particularly preferably not greater than 30 parts by mass.

The liquid rubber is not particularly limited as long as it is a polymer in a liquid state at room temperature (25° C.), and examples of the liquid rubber include liquid butadiene rubber (liquid BR), liquid styrene-butadiene rubber (liquid SBR), liquid isoprene rubber (liquid IR), liquid styrene-isoprene rubber (liquid SIR), and liquid farnesene rubber. These liquid rubbers may be used individually, or two or more of these liquid rubbers may be used in combination.

In the case where the rubber composition contains a liquid rubber, the amount of the liquid rubber per 100 parts by mass of the rubber component is preferably not less than 1 part by mass, more preferably not less than 3 parts by mass, and further preferably not less than 5 parts by mass. The amount of the liquid rubber is preferably not greater than 50 parts by mass, more preferably not greater than 40 parts by mass, and further preferably not greater than 20 parts by mass.

The wax is not particularly limited, and examples of the wax include: petroleum waxes such as paraffin wax and microcrystalline wax; and synthesized waxes such as polymers of ethylene, propylene, and the like. As commercially available products, products of OUCHI SHINKO CHEMI- CAL INDUSTRIAL CO., LTD., NIPPON SEIRO CO., LTD., Seiko Chemical Co., Ltd., etc., can be used. These waxes may be used individually, or two or more of these waxes may be used in combination.

In the case where the rubber composition contains a wax, from the viewpoint of the weather resistance of the rubber, the amount of the wax per 100 parts by mass of the rubber component is preferably not less than 0.5 parts by mass, more preferably not less than 1.0 part by mass, and further preferably not less than 1.5 parts by mass. From viewpoint of preventing whitening of the tire due to blooming, the amount of the wax is preferably not greater than 10 parts by mass and more preferably not greater than 5.0 parts by mass.

The antioxidant is not particularly limited, and examples of the antioxidant include antioxidants such as amine-based compounds, quinoline-based compounds, quinone-based compounds, phenol-based compounds, imidazole-based compounds, and carbamic acid metal salts. Phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, and N-cyclohexyl-N'-phenyl-p-phenylenediamine, and quinoline-based antioxidants such as a 2,2,4-trimethyl-1,2-dihydroquinoline polymer and 6-ethoxy-2,2,4-trimethyl-1,2-dihydroquinoline are preferable. These antioxidants may be used individually, or two or more of these antioxidants may be used in combination.

In the case where the rubber composition contains an antioxidant, from the viewpoint of the ozone crack resistance of the rubber, the amount of the antioxidant per 100 parts by mass of the rubber component is preferably not less than 0.5 parts by mass, more preferably not less than 1.0 part by mass, and further preferably not less than 1.5 parts by mass. From the viewpoint of wear resistance and wet grip performance, the amount of the antioxidant is preferably not greater than 10 parts by mass and more preferably not greater than 5.0 parts by mass.

As the stearic acid, a conventionally known one can be used, and, for example, products of NOF Corporation, Kao Corporation, FUJIFILM Wako Pure Chemical Corporation, Chiba Fatty Acid Co., Ltd., etc., can be used. These stearic acids may be used individually, or two or more of these stearic acids may be used in combination.

In the case where the rubber composition contains stearic acid, from the viewpoint of processability, the amount of the stearic acid per 100 parts by mass of the rubber component is preferably not less than 0.5 parts by mass, more preferably not less than 1.0 part by mass, and further preferably not less than 1.5 parts by mass. From the viewpoint of a vulcanization rate, the amount of the stearic acid is preferably not greater than 10 parts by mass and more preferably not greater than 5.0 parts by mass.

As the zinc oxide, a conventionally known one can be used, and, for example, products of Mitsui Mining & Smelting Co., Ltd., Toho Zinc Co., Ltd., HakusuiTech Co., Ltd., SEIDO CHEMICAL INDUSTRY CO., LTD., Sakai Chemical Industry Co., Ltd., etc., can be used. These zinc oxides may be used individually, or two or more of these zinc oxides may be used in combination.

In the case where the rubber composition contains zinc oxide, from the viewpoint of processability, the amount of the zinc oxide per 100 parts by mass of the rubber component is preferably not less than 0.5 parts by mass, more preferably not less than 1.0 part by mass, and further preferably not less than 1.5 parts by mass. From the viewpoint of wear resistance, the amount of the zinc oxide is preferably not greater than 10 parts by mass and more preferably not greater than 5.0 parts by mass.

As the vulcanizing agent, sulfur is suitably used. As the sulfur, powdery sulfur, oil-treated sulfur, precipitated sulfur, colloidal sulfur, insoluble sulfur, highly dispersible sulfur, etc., can be used.

In the case where the rubber composition contains sulfur as a vulcanizing agent, from the viewpoint of ensuring a sufficient vulcanization reaction, the amount of the sulfur per 100 parts by mass of the rubber component is preferably not less than 0.1 parts by mass, more preferably not less than 0.5 parts by mass, and further preferably not less than 1.0 part by mass. From the viewpoint of prevention of deterioration, the amount of the sulfur is preferably not greater than 5.0 parts by mass, more preferably not greater than 4.0 parts by mass, and further preferably not greater than 3.5 parts by mass. When oil-containing sulfur is used as a vulcanizing agent, the amount of the vulcanizing agent is represented as the amount of pure sulfur contained in the oil-containing sulfur.

Examples of vulcanizing agents other than sulfur include alkylphenol-sulfur chloride condensates, sodium 1,6-hexamethylene dithiosulfate dihydrate, and 1,6-bis(N,N'-dibenzylthiocarbamoyldithio) hexane. As these vulcanizing agents other than sulfur, products commercially available from Taoka Chemical Co., Ltd., LANXESS, Flexsys, etc., can be used.

Examples of the vulcanization accelerator include sulfenamide-based vulcanization accelerators, thiazole-based vulcanization accelerators, thiuram-based vulcanization accelerators, thiourea-based vulcanization accelerators, guanidine-based vulcanization accelerators, dithiocarbamic acid-based vulcanization accelerators, aldehyde-amine-based vulcanization accelerators, aldehyde-ammonia-based vulcanization accelerators, imidazoline-based vulcanization accelerators, and xanthate-based vulcanization accelerators. These vulcanization accelerators may be used individually, or two or more of these vulcanization accelerators may be used in combination. Among them, from the viewpoint of more suitably obtaining the desired effect, one or more vulcanization accelerators selected from the group consisting of sulfenamide-based vulcanization accelerators, guanidine-based vulcanization accelerators, and thiazole-based vulcanization accelerators are preferable, and sulfenamide-based vulcanization accelerators are more preferable.

Examples of the sulfenamide-based vulcanization accelerators include N-tert-butyl-2-benzothiazolyl sulfenamide (TBBS), N-cyclohexyl-2-benzothiazolyl sulfenamide (CBS), and N,N-dicyclohexyl-2-benzothiazolyl sulfenamide (DCBS). Among them, N-tert-butyl-2-benzothiazolyl sulfenamide (TBBS) and N-cyclohexyl-2-benzothiazolyl sulfenamide (CBS) are preferable.

Examples of the guanidine-based vulcanization accelerators include 1,3-diphenylguanidine (DPG), 1,3-di-o-tolylguanidine, 1-o-tolylbiguanide, a di-o-tolylguanidine salt of dicatechol borate, 1,3-di-o-cumenylguanidine, 1,3-di-o-biphenylguanidine, and 1,3-di-o-cumenyl-2-propionylguanidine. Among them, 1,3-diphenylguanidine (DPG) is preferable.

Examples of the thiazole-based vulcanization accelerators include 2-mercaptobenzothiazole, a cyclohexylamine salt of 2-mercaptobenzothiazole, and di-2-benzothiazolyl disulfide. Among them, 2-mercaptobenzothiazole is preferable.

In the case where the rubber composition contains a vulcanization accelerator, the amount of the vulcanization accelerator per 100 parts by mass of the rubber component is preferably not less than 1.0 part by mass, more preferably not less than 1.5 parts by mass, and further preferably not less than 2.0 parts by mass. The amount of the vulcanization accelerator is preferably not greater than 8.0 parts by mass, more preferably not greater than 7.0 parts by mass, further preferably not greater than 6.0 parts by mass, and particularly preferably not greater than 5.0 parts by mass. When the amount of the vulcanization accelerator is set to be within such a range, it tends to be possible to ensure fracture strength and elongation.

The rubber composition is produced, for example, by kneading the respective components described above, using a rubber kneading device such as an open roll and a Banbury mixer.

As for the kneading conditions, in a base kneading step of kneading the additives other than the vulcanizing agent and the vulcanization accelerator, the kneading temperature is normally 100 to 180° C. and preferably 120 to 170° C. In a finish kneading step of kneading the vulcanizing agent and the vulcanization accelerator, the kneading temperature is normally 120° C. or lower and preferably 85 to 110° C.

The produced rubber composition is processed into a predetermined shape using an extruder or the like. In a forming machine, the processed rubber composition is combined with sidewalls, etc., to prepare a green tire (unvulcanized tire). The green tire is vulcanized in a mold incorporated in a vulcanizing machine, thereby obtaining a tire. The tire is a crosslinked product of the green tire. The vulcanization temperature is normally 140 to 190° C. and preferably 150 to 185° C. The vulcanization time is normally 5 to 15 minutes.

The rubber composition described above is used for the tread of a tire (specifically, a cap portion which comes into contact with a road surface during running). Next, a tire having a tread formed using this rubber composition will be described.

[Tire]

FIG. 1 is a plan view illustrating a development of a part of a tread 4 of a tire 2 according to one embodiment of the present disclosure. The tire 2 is mounted to a vehicle such as a truck and a bus. The tire 2 is a heavy duty tire.

In FIG. 1, a direction indicated by a double-headed arrow AD is the axial direction of the tire 2. The axial direction of the tire 2 means a direction parallel to the rotation axis of the tire 2. A direction indicated by a double-headed arrow CD is the circumferential direction of the tire 2. The direction perpendicular to the surface of the drawing sheet of FIG. 1 is the radial direction of the tire 2. In FIG. 1, an alternate long and short dash line CL extending in the circumferential direction represents the equator plane of the tire 2.

In FIG. 1, a side indicated by an arrow CD1 is a first direction side in the circumferential direction of the tire 2, and a side indicated by an arrow CD2 is a second direction side in the circumferential direction of the tire 2.

FIG. 1 shows a tread pattern formed on the tread 4. The tread pattern of the present disclosure will be described below using the tread pattern shown in FIG. 1 as an example. In the present disclosure, the internal structure of the tire 2 is not particularly limited. Although not described in detail, the tire 2 has a general internal structure as the internal structure of a heavy duty tire.

The tread 4 is located on the radially outer side in the tire 2 and extends in the circumferential direction. The outer circumferential surface of the tread 4 is a tread surface 6. The tire 2 comes into contact with a road surface at the tread surface 6. The tread 4 has the tread surface 6 which comes into contact with a road surface.

The tread 4 is formed from a crosslinked rubber. The tread 4 is a crosslinked product of the above-described rubber composition.

Grooves 8 are formed on the tread 4. Accordingly, a tread pattern is formed.

The point of intersection of the tread surface 6 and the equator plane CL corresponds to an equator. In the case where the groove 8 is located on the equator plane CL as shown in FIG. 1, the equator is specified on the basis of a virtual outer surface obtained on the assumption that the groove 8 is not provided on the equator plane CL.

An alternate long and two short dashes line indicated by reference sign TE represents an end of the tread surface 6.

In the tire, when the end of the tread surface cannot be identified from the appearance, a position, on the outer surface of the tire, corresponding to an axially outer end of a ground-contact surface obtained when a normal load is applied to the tire in a normal state and the tire is brought into contact with a flat surface with a camber angle being set to 0°, is used as the end of the tread surface.

In the tread surface 6 shown in FIG. 1, an end TE (not shown) of the tread surface 6 located on the left side of the equator plane CL is a first end TE1. An end TE of the tread surface 6 located on the right side of the equator plane CL is a second end TE2.

In FIG. 1, a length indicated by reference sign TW is the width of the tread surface 6. The width TW of the tread surface 6 is the distance in the axial direction from the first end TE1 to the second end TE2 of the tread surface 6. The width TW of the tread surface 6 is represented as a length measured along the tread surface 6.

Figure 2:
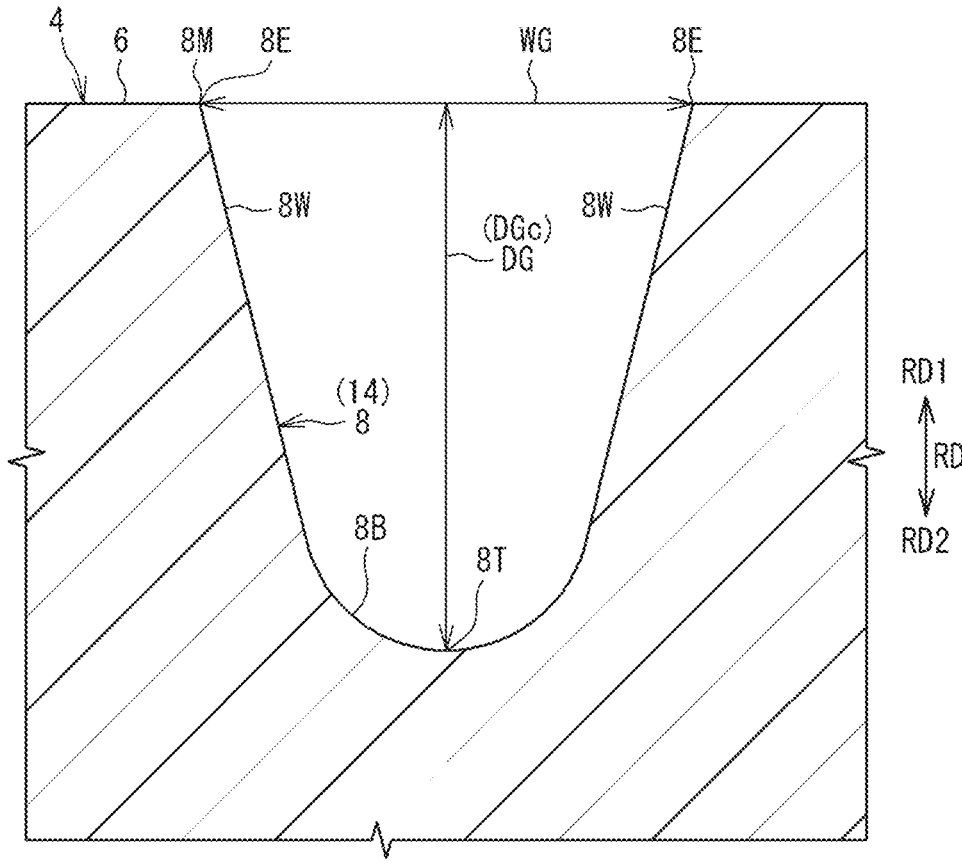
FIG. 2 is a cross-sectional view taken along a line II-II in FIG. 1.

FIG. 2 is a cross-sectional view of FIG. 1 taken along a line II-II. FIG. 2 shows a cross-section of the groove 8, specifically, a center circumferential main groove described later. The main configuration of the groove 8 will be described with reference to FIG. 2.

In FIG. 2, a direction indicated by a double-headed arrow RD is the radial direction of the tire 2. A side indicated by an arrow RD1 is the radially outer side of the tire 2, and a side indicated by an arrow RD2 is the radially inner side of the tire 2. In the present disclosure, a cross-section of the groove 8 is represented by a cross-section along a plane perpendicular to the longitudinal direction of the groove 8.

The groove 8 has a pair of wall surfaces 8W including a groove opening 8M, and a bottom surface 8B including a groove bottom 8T. The groove width of the groove 8 is represented as the distance between a first wall surface 8W and a second wall surface 8W which are the pair of wall surfaces 8W, that is, the inter-wall surface distance.

In FIG. 2, a length indicated by a double-headed arrow WG is the groove width of the groove 8 at the groove opening 8M. The groove width WG is represented as the shortest distance between a pair of edges 8E forming the groove opening 8M. In the case where a portion of the groove 8 at the groove opening 8M is processed in a tapered manner, the groove width at the groove opening 8M of the groove 8 is represented on the basis of virtual edges obtained on the assumption that the portion of the groove 8 at the groove opening 8M is not processed in a tapered manner.

A length indicated by a double-headed arrow DG is the groove depth of the groove 8. The groove depth DG of the groove 8 is represented as the shortest distance from a line segment connecting the left and right edges 8E to the groove bottom 8T of the groove 8.

The position, the groove width WG, and the groove depth DG of the groove 8 are determined as appropriate according to the specifications of the tire 2.

The groove bottom 8T is the deepest position in the cross-section of the groove 8. The distance from the line segment connecting the left and right edges 8E forming the groove opening 8M, to the bottom surface 8B, is measured along a normal line of this line segment. A position at which the distance from the line segment to the bottom surface 8B is the largest is the groove bottom 8T.

The bottom surface 8B shown in FIG. 2 is a curved surface. The bottom surface 8B may include a flat surface, and this flat surface may include the groove bottom 8T. In this case, the width center of the flat surface is used as the groove bottom 8T.

The grooves 8 each having a groove width WG of less than 1.0 mm at the groove opening 8M are also referred to as sipes. The grooves 8 other than sipes are also referred to as ordinary grooves, and each have a groove width WG of not less than 1.0 mm at the groove opening 8M thereof.

A sipe may include a portion (hereinafter referred to as ordinary groove equivalent portion) having a groove width of not less than 1.0 mm, between the groove opening 8M and the groove bottom 8T thereof. In this case, the sipe becomes an ordinary groove when the tread 4 becomes worn and the ordinary groove equivalent portion is exposed.

An ordinary groove may include a portion (hereinafter referred to as sipe equivalent portion) having a groove width of less than 1.0 mm, between the groove opening 8M and the groove bottom 8T thereof. In this case, the ordinary groove becomes a sipe when the tread 4 becomes worn and the sipe equivalent portion is exposed.

An ordinary groove that has a narrow groove width and that allows a pair of wall surfaces to come into contact with each other when the tire comes into contact with a road surface is also referred to as narrow groove. An ordinary groove that has a wide groove width and a pair of wall surfaces that do not come into contact with each other even when the tire comes into contact with a road surface is also referred to as main groove.

As shown in FIG. 1, a plurality of circumferential main grooves 10 are formed on the tread 4 of the tire 2 so as to be aligned in the axial direction. Each circumferential main groove 10 extends continuously in the circumferential direction. The circumferential main groove 10 is the above-described main groove. The tread 4 has the plurality of circumferential main grooves 10 aligned in the axial direction and extending continuously in the circumferential direction.

The groove depth of each circumferential main groove 10 is, for example, not less than 10 mm and not greater than 21 mm. From the viewpoint that the tire 2 can exhibit excellent wet performance, the groove depth is preferably not less than 13 mm and not greater than 18 mm.

The tread 4 shown in FIG. 1 has three circumferential main grooves 10 aligned in the axial direction. Among the three circumferential main grooves 10, the circumferential main groove 10 located on each outermost side in the axial direction is a shoulder circumferential main groove 12. The circumferential main groove 10 located on the equator plane CL is a crown circumferential main groove 14. The plurality of circumferential main grooves 10 formed on the tread 4 include the crown circumferential main groove 14 and a pair of the shoulder circumferential main grooves 12.

In the case where a circumferential main groove is further provided between the crown circumferential main groove 14 and each shoulder circumferential main groove 12, this circumferential main groove is also referred to as middle circumferential main groove.

In FIG. 1, a length indicated by a double-headed arrow WGc is the groove width at the groove opening of the crown circumferential main groove 14. A length indicated by a double-headed arrow WGh is the groove width at the groove opening of the shoulder circumferential main groove 12.

The ratio (WGc/TW) of the groove width WGc of the crown circumferential main groove 14 to the width TW of the tread surface 6 exceeds 2.0%. Specifically, the ratio (WGc/TW) is preferably not less than 4.0% and not greater than 10%.

As shown in FIG. 1, the groove width WGh of the shoulder circumferential main groove 12 is larger than the groove width WGc of the crown circumferential main groove 14. The ratio (WGh/TW) of the groove width WGh of the shoulder circumferential main groove 12 to the width TW of the tread surface 6 is preferably not less than 5.0% and not greater than 11%.

As shown in FIG. 1, a projection 16 is provided on the bottom surface of the crown circumferential main groove 14 so as to project from the bottom surface. A plurality of projections 16 are arranged so as to be spaced at predetermined intervals in the circumferential direction. The projections 16 prevent stones from being trapped in the crown circumferential main groove 14.

As described above, the tread 4 has the plurality of circumferential main grooves 10. The plurality of circumferential main grooves 10 define a plurality of land portions 18 in the tread 4.

In the tread 4 shown in FIG. 1, four land portions 18 are formed by forming the three circumferential main grooves 10 thereon. Among the four land portions 18, the land portions 18 closest to the equator plane CL are crown land portions 20. In other words, the land portions 18 located on both sides of the crown circumferential main groove 14 are crown land portions 20. The land portion 18 located on each outermost side in the axial direction is a shoulder land portion 22. The shoulder land portion 22 is located axially outward of the shoulder circumferential main groove 12 and includes the end TE of the tread surface 6. The plurality of land portions 18 formed in the tread 4 include a pair of the crown land portions 20 and a pair of the shoulder land portions 22.

In the case where a land portion is further provided between each crown land portion 20 and each shoulder land portion 22, this land portion is also referred to as middle land portion.

In FIG. 1, a length indicated by a double-headed arrow WLS is the maximum width of the shoulder land portion 22. In each shoulder land portion 22 of the tire 2, the ratio (WLS/TW) of the maximum width WLS to the width TW of the tread surface 6 is not less than 15% and not greater than 25%.

The shoulder land portion 22 has shoulder lateral grooves 62. The shoulder lateral grooves 62 traverse the shoulder land portion 22. The shoulder lateral grooves 62 are shallower than crown sipes 40 described later.

Each shoulder lateral groove 62 includes an inner shoulder lateral groove 64 located on the equator plane side and an outer shoulder lateral groove 66 located on the end side of the tread surface 6.

The shoulder land portion 22 further has a shoulder narrow groove 68 extending continuously in the circumferential direction. The shoulder narrow groove 68 intersects each shoulder lateral groove 62 at the boundary between the inner shoulder lateral groove 64 and the outer shoulder lateral groove 66. The shoulder narrow groove 68 is shallower than the crown sipes 40 described later.

Figure 3:
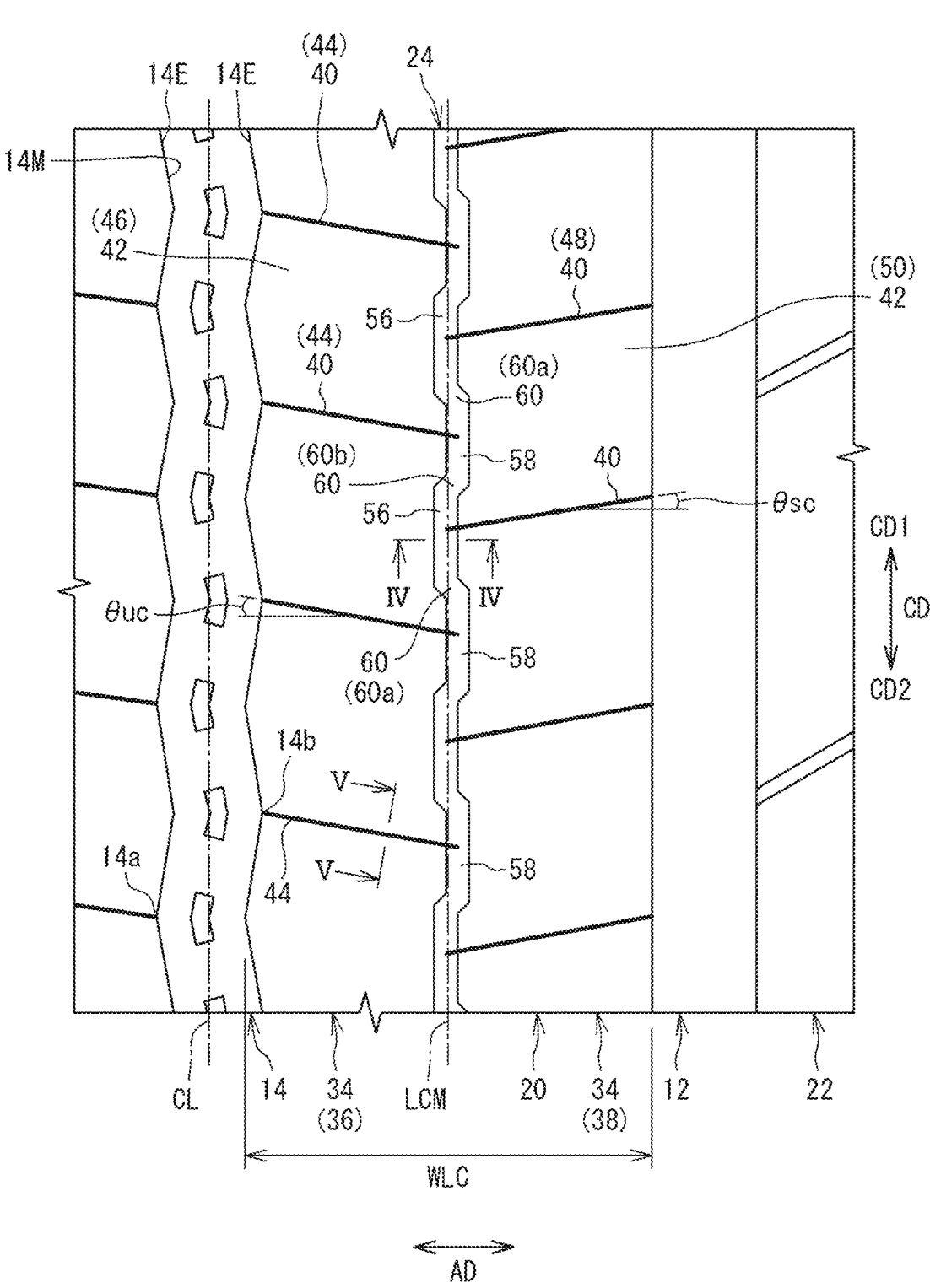
FIG. 3 is an enlarged development view showing a part of FIG. 1.

FIG. 3 shows a part of the tread surface 6 shown in FIG. 1. FIG. 3 shows the crown land portion 20.

Each of the two crown land portions 20 provided in the tread 4 of the tire 2 has a crown narrow groove 24 extending continuously in the circumferential direction.

At least one crown narrow groove 24 is formed on the crown land portion 20. One crown narrow groove 24 is formed on the crown land portion 20 shown in FIG. 3.

In FIG. 3, a length indicated by a double-headed arrow WLC is the maximum width of the crown land portion 20. In the crown land portion 20 of the tire 2, the ratio (WLC/ TW) of the maximum width WLC to the width TW of the tread surface 6 is not less than 17% and not greater than 27%.

In FIG. 3, an alternate long and short dash line LCM is a maximum width center line of the crown land portion 20. The crown narrow groove 24 is located on the maximum width center line LCM. In other words, the crown narrow groove 24 is located so as to overlap the maximum width center line LCM in the radial direction.

Figure 4:
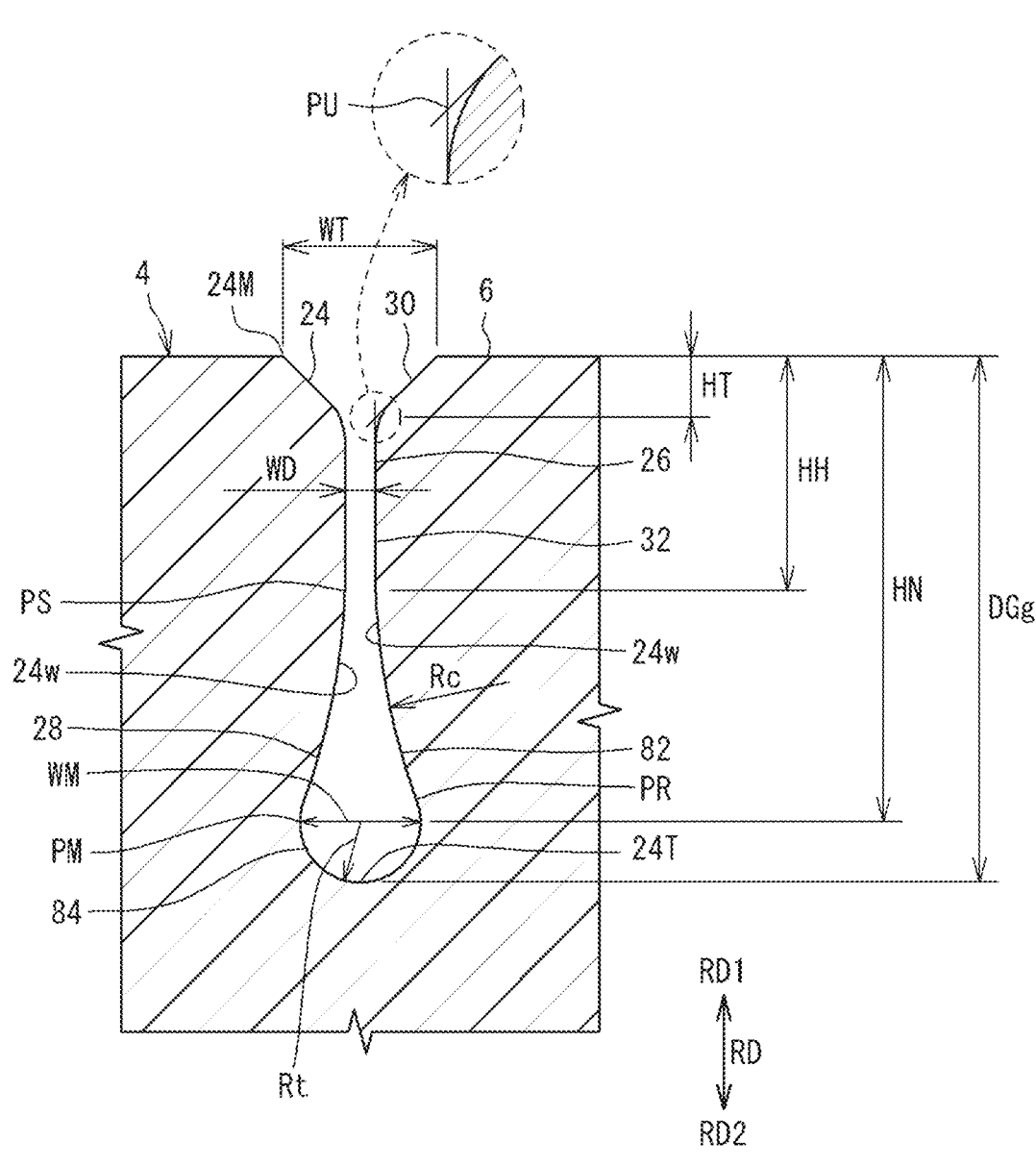
FIG. 4 is a cross-sectional view taken along a line IV-IV in FIG. 3.

FIG. 4 is a cross-sectional view of the crown narrow groove 24 taken along a line IV-IV in FIG. 3. FIG. 4 shows a cross-section of the crown narrow groove 24 along a plane perpendicular to the length direction of the crown narrow groove 24.

The crown narrow groove 24 includes a body portion 26 and an enlarged width portion 28. The body portion 26 of the crown narrow groove 24 shown in FIG. 4 includes a tapered portion 30 and a body portion main body 32.

The crown narrow groove 24 is the above-described narrow groove. When the tire 2 comes into contact with a road surface and the tread 4 is deformed, a pair of opposing wall surfaces 24W of the crown narrow groove 24 come into contact with each other at the body portion main body 32.

The tapered portion 30 includes a groove opening 24M of the crown narrow groove 24. The tapered portion 30 is tapered inward from the groove opening 24M. A contour of each wall surface of the tapered portion 30 shown in FIG. 4 is represented by a straight line. This contour may be represented by a curve. In FIG. 4, a length indicated by a double-headed arrow WT is the groove width at the groove opening 24M of the tapered portion 30.

The groove width WT of the tapered portion 30 is preferably not less than 0.15 times and not greater than 0.35 times the groove width WGc of the crown circumferential main groove 14.

The body portion main body 32 is located radially inward of the tapered portion 30. The body portion main body 32 is connected to the tapered portion 30. The body portion main body 32 extends straight in the depth direction of the crown narrow groove 24. A contour of each wall surface of the body portion main body 32 is represented by a straight line. The body portion main body 32 has a uniform groove width in the depth direction of the crown narrow groove 24.

In FIG. 4, a position indicated by reference sign PU is the boundary between the tapered portion 30 and the body portion main body 32. The boundary PU is represented as the point of intersection of the wall surface contour line of the tapered portion 30 and the wall surface contour line of the body portion main body 32. As shown in FIG. 4, in the case where the boundary portion between the tapered portion 30 and the body portion main body 32 is rounded, the boundary PU is represented as the point of intersection of an extension line of the wall surface contour line of the tapered portion 30 and an extension line of the wall surface contour line of the body portion main body 32.

The tapered portion 30 does not have to be provided in the crown narrow groove 24. In this case, the body portion 26 is composed of only the body portion main body 32.

From the viewpoint that the tire 2 can effectively suppress concentration of strain on the groove opening 24M of the crown narrow groove 24 while ensuring the groove volume of the crown narrow groove 24, it is preferable that the tapered portion 30 is provided in the crown narrow groove 24 as shown in FIG. 4.

In FIG. 4, a length indicated by a double-headed arrow WD is the groove width of the body portion main body 32. A portion of the crown narrow groove 24 at the groove opening 24M is processed in a tapered manner. The groove width of the crown narrow groove 24 is represented as a groove width at a virtual groove opening obtained on the assumption that the tapered portion 30 is not provided. The groove width at the virtual groove opening is equal to the groove width WD of the body portion main body 32.

The enlarged width portion 28 is located radially inward of the body portion 26, specifically, the body portion main body 32. The enlarged width portion 28 is connected to the body portion main body 32. The enlarged width portion 28 has a groove width larger than the groove width WD of the body portion main body 32. The enlarged width portion 28 includes a groove bottom 24T of the crown narrow groove 24.

In FIG. 4, a position indicated by reference sign PS is the boundary between the body portion main body 32 and the enlarged width portion 28. As described above, in the cross-section of the crown narrow groove 24, each wall surface contour line of the body portion main body 32 is a straight line. In the present disclosure, the position at which a wall surface contour line of the enlarged width portion 28 converges with the wall surface contour line of the body portion main body 32 is the boundary PS between the body portion main body 32 and the enlarged width portion 28. Specifically, the position at which the groove width from the body portion main body 32 to the enlarged width portion 28 is 1.1 times the groove width WD of the body portion main body 32 is represented as the boundary PS between the body portion main body 32 and the enlarged width portion 28. the boundary PS between the body portion main body 32 and the enlarged width portion 28 is the boundary between the body portion 26 and the enlarged width portion 28.

In FIG. 4, a length indicated by a double-headed arrow WM is the maximum groove width of the enlarged width portion 28. In FIG. 4, a position indicated by reference sign PM is the position at which the enlarged width portion 28 has the maximum groove width WM.

The enlarged width portion 28 is tapered outward from a portion where the enlarged width portion 28 has the maximum groove width WM. In the portion from the maximum groove width position PM to the boundary PS, the enlarged width portion 28 is curved so as to be recessed inward from the outer side thereof.

The enlarged width portion 28 is tapered inward from the portion where the enlarged width portion 28 has the maximum groove width WM. In the portion from the maximum groove width position PM to the groove bottom 24T, the enlarged width portion 28 has a rounded contour. In this portion, the enlarged width portion 28 is curved so as to bulge outward from the inner side thereof.

In the enlarged width portion 28, the boundary between the portion curved so as to be recessed inward from the outer side thereof and the portion curved so as to bulge outward from the inner side thereof is located radially outward of the maximum groove width position PM.

The enlarged width portion 28 includes an inflection portion 82 and a bottom portion 84. The inflection portion 82 is located radially inward of the body portion main body 32. The bottom portion 84 is located radially inward of the inflection portion 82.

The inflection portion 82 connects the body portion main body 32 and the bottom portion 84. The groove width of the inflection portion 82 gradually increases from the body portion main body 32 side toward the bottom portion 84 side. The inflection portion 82 is curved so as to be recessed inward from the outer side thereof. In the tire 2, the contour of the inflection portion 82 is represented by an arc. In FIG. 4, an arrow Rc indicates the radius of the arc representing the contour of the inflection portion 82.

The bottom portion 84 includes the groove bottom 24T. The bottom portion 84 has a rounded contour. The bottom portion 84 is curved so as to bulge outward from the inner side thereof. The contour of the bottom portion 84 of the crown narrow groove 24 shown in FIG. 4 is represented by an arc. In FIG. 4, an arrow Rt indicates the radius of the arc representing the contour of the bottom portion 84. The radius Rt of this arc is, for example, not less than 1.5 mm and not greater than 3.5 mm.

A position indicated by reference sign PR is the boundary between the inflection portion 82 and the bottom portion 84. The arc representing the contour of the inflection portion 82 and the arc representing the contour of the bottom portion 84 are tangent to each other at the boundary PR.

As shown in FIG. 4, the maximum groove width position PM of the enlarged width portion 28 is included in the bottom portion 84. In other words, the maximum groove width position PM is located radially inward of the boundary PR. The maximum groove width WM of the enlarged width portion 28 is equal to twice the radius Rt of the arc representing the contour of the bottom portion 84.

In the tire 2, the radius Rc of the arc representing the contour of the inflection portion 82 is larger than the radius Rt of the arc representing the contour of the bottom portion 84. Accordingly, the crown narrow groove 24 can sufficiently exhibit its function. From this viewpoint, the ratio Rc/Rt of the radius Rc of the arc representing the contour of the inflection portion 82 to the radius Rt of the arc representing the contour of the bottom portion 84 is preferably not less than 1.5 and not greater than 20.

When the ratio Rc/Rt is set to be not less than 1.5, the tire 2 can suppress occurrence of uneven wear due to sudden stiffness change. From this viewpoint, the ratio Rc/Rt is more preferably not less than 2.0.

When the ratio Rc/Rt is set to be not greater than 20, the enlarged width portion 28 can effectively contribute to suppressing a decrease in wet performance. From this viewpoint, the ratio Rc/Rt is more preferably not greater than 15.

As described above, the enlarged width portion 28 has a groove width wider than the groove width WD of the body portion main body 32. From the viewpoint of maintaining wet performance, the maximum groove width WM of the enlarged width portion 28 is preferably not less than two times and more preferably not less than three times the groove width WD of the body portion main body 32. From the viewpoint that the influence on the stiffness of the crown land portion 20 can be suppressed and the tire 2 can maintain good uneven wear resistance, the maximum groove width WM of the enlarged width portion 28 is preferably not greater than eight times and more preferably not greater than seven times the groove width WD of the body portion main body 32.

In FIG. 4, a length indicated by a double-headed arrow DGg is the groove depth of the crown narrow groove 24. A length indicated by a double-headed arrow HH is the groove depth of the body portion 26. The groove depth HH of the body portion 26 is the groove depth from the groove opening 24M of the crown narrow groove 24 to the boundary PS between the body portion main body 32 and the enlarged width portion 28. A length indicated by a double-headed arrow HT is the groove depth of the tapered portion 30. The groove depth HT of the tapered portion 30 is the groove depth from the groove opening 24M of the crown narrow groove 24 to the boundary PU between the tapered portion 30 and the body portion main body 32.

From the viewpoint that the tire 2 can effectively suppress concentration of strain on the groove opening 24M of the crown narrow groove 24 while ensuring the groove volume of the crown narrow groove 24, the ratio (HT/DGg) of the groove depth HT of the tapered portion 30 to the groove depth DGg of the crown narrow groove 24 is preferably not less than 0.12 and not greater than 0.14.

As described above, the crown land portion 20 has the crown narrow groove 24 (specifically, one crown narrow groove 24). The crown narrow groove 24 defines two crown narrow land portions 34 in the crown land portion 20. Of the two crown narrow land portions 34, the crown narrow land portion 34 closer to the equator plane CL is an inner crown narrow land portion 36, and the crown narrow land portion 34 closer to the end TE of the tread surface 6 is an outer crown narrow land portion 38.

Each of the two crown narrow land portions 34 has a plurality of crown sipes 40 traversing the crown narrow land portion 34. The plurality of crown sipes 40 define a plurality of crown blocks 42 in the crown narrow land portion 34. The crown sipes 40 are shallower than the crown circumferential main groove 14.

The crown sipes 40 provided on the inner crown narrow land portion 36 are also referred to as inner crown sipes 44. The crown blocks 42 of the inner crown narrow land portion 36 are also referred to as inner crown blocks 46. The crown sipes 40 provided on the outer crown narrow land portion 38 are also referred to as outer crown sipes 48. The crown blocks 42 of the outer crown narrow land portion 38 are also referred to as outer crown blocks 50.

Figure 5:
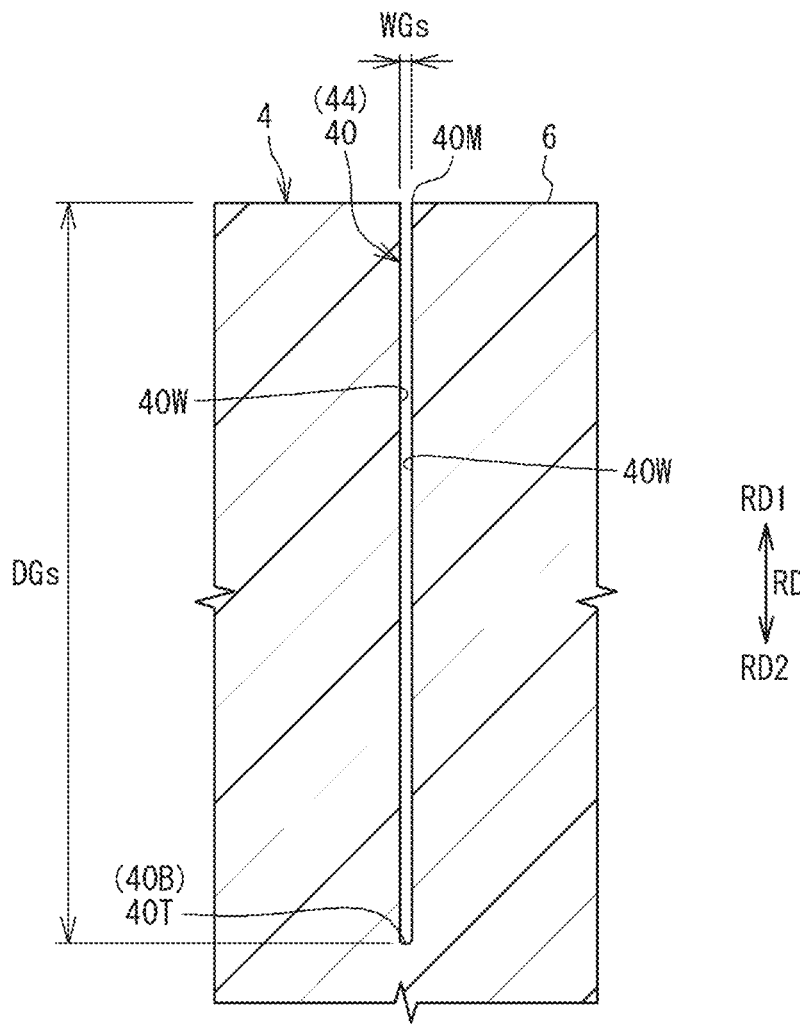
FIG. 5 is a cross-sectional view taken along a line V-V in FIG. 3.

FIG. 5 is a cross-sectional view of the crown sipe 40, specifically, the inner crown sipe 44, taken along a line V-V in FIG. 3. FIG. 5 shows a cross-section of the inner crown sipe 44 along a plane perpendicular to the length direction of the inner crown sipe 44. The cross-sectional shape of each outer crown sipe 48 is the same as that of each inner crown sipe 44. The cross-sectional shape of each crown sipe 40 will be described using the inner crown sipe 44 as an example.

The crown sipe 40 extends straight in the depth direction thereof. The crown sipe 40 has a pair of wall surfaces 40W including a groove opening 40M, and a bottom surface 40B including a groove bottom 40T.

In FIG. 5, a double-headed arrow WGs indicates the groove width at the groove opening 40M of the crown sipe 40. A double-headed arrow DGs indicates the groove depth of the crown sipe 40.

The groove width WGs of each crown sipe 40 of the tire 2 is less than 1.0 mm. When a load acts on the crown narrow land portion 34 and the crown narrow land portion 34 is deformed, the wall surfaces 40W of the crown sipe 40 come into contact with and support each other.

The groove depth DGs of each crown sipe 40 is shallower than the groove depth DGg of the crown narrow groove 24.

As the tread 4 becomes worn, each crown sipe 40 disappears before the crown narrow groove 24.

The crown narrow groove 24 of the tire 2 has the body portion main body 32 having a narrow groove width. When the tread surface 6 comes into contact with a road surface, the tread 4 becomes deformed. By this deformation, the opposing wall surfaces 24W of the crown narrow groove 24 are brought into contact with each other at the body portion main body 32 of the crown narrow groove 24. The crown narrow land portions 34 located on both sides of the crown narrow groove 24 support each other. Deformation of the crown land portion 20 is suppressed. The crown narrow groove 24 can contribute to reduction of rolling resistance.

On the other hand, since the apparent stiffness of the crown land portion 20 is increased, there is a concern about a decrease in wet performance. However, the crown sipes 40 are provided on each crown narrow land portion 34 so as to transverse the crown narrow land portion 34. The crown sipes 40 can function as edge components that scratch a road surface. The crown sipes 40 suppress a decrease in wet performance. Thus, it is inferred that in the initial stage of wear, the tire 2 can suppress a decrease in wet performance due to wear while reducing rolling resistance.

As the wear of the tread 4 proceeds, the groove volume of the circumferential main grooves 10, etc., decreases. There is a concern about a decrease in wet performance. However, the enlarged width portion 28 is located radially inward of the body portion main body 32 of the crown narrow groove 24. When the body portion main body 32 disappears, the enlarged width portion 28 is exposed. The enlarged width portion 28 has a groove width wider than the groove width of the body portion main body 32. The enlarged width portion 28 can contribute to suppressing a decrease in wet performance. On the other hand, the volume of the tread 4 decreases due to wear. The deformation allowance of the tread 4 is reduced, and thus the apparent stiffness of the tread 4 is increased. The increase in stiffness can contribute to reduction of rolling resistance. Thus, it is inferred that in the middle stage of wear, the tire 2 can suppress a decrease in wet performance due to wear while reducing rolling resistance.

As the wear of the tread 4 proceeds further, the volume of the tread 4 decreases further. Since the crown sipes 40 are shallower than the crown narrow groove 24, the crown sipes 40 disappear before the crown narrow groove 24. The apparent stiffness of the tread 4 is increased further. The increase in stiffness is advantageous for rolling resistance, but disadvantageous for wet performance. In the later stage of wear when the crown sipes 40 disappear, the enlarged width portion 28 remains, but it may be impossible for the tire 2 to suppress a decrease in wet performance.

However, the rubber composition for forming the tread 4 of the tire 2 contains a styrene butadiene rubber and silica. As the glass transition temperature (Tg) of the rubber component is increased, a road surface following property in a micro-deformation region is improved. Regardless of the stage of wear, the tread 4 can contribute to improvement of wet performance. In particular, since the amount CSB of the styrene butadiene rubber, the amount BS of the silica, the groove depth DGg of the crown narrow groove 24, and the groove depth DGs of each crown sipe 40 are set so as to satisfy the above-described relational expression, a decrease in wet performance is suppressed even in the later stage of wear due to the synergistic effect of the styrene butadiene rubber and the silica.

The tread 4 of the tire 2 becomes worn due to use. Not only in the initial stage of wear, but also in the later stage of wear when the crown sipes 40 disappear, the tire 2 can suppress a decrease in wet performance due to wear while reducing rolling resistance. In other words, the tire 2 can suppress a decrease in wet performance, while maintaining low rolling resistance, from the time when the use of the tire 2 is started until the tire 2 needs to be replaced.

As described above, the crown sipes 40 are shallower than the crown narrow groove 24. In other words, the crown narrow groove 24 is deeper than the crown sipes 40. Specifically, the groove depth DGg (mm) of the crown narrow groove 24 and the groove depth DGs (mm) of each crown sipe 40 preferably satisfy the following relational expression.

$$2.0 \leq (DGg - DGs) \leq 10.0$$

After the crown sipes 40 disappear, the crown narrow groove 24 remains, but the influence of the stiffness of the tread 4 after the disappearance of the crown sipes 40 on rolling resistance and wet performance is suppressed to a small level. Even in the later stage of wear, the tire 2 can suppress a decrease in wet performance while maintaining low rolling resistance. From this viewpoint, the groove depth DGg (mm) of the crown narrow groove 24 and the groove depth DGs (mm) of each crown sipe 40 more preferably satisfy the following relational expression.

$$3.0 \leq (DGg - DGs) \leq 7.0$$

In FIG. 4, a length indicated by a double-headed arrow HN is the groove depth from the groove opening 24M of the crown narrow groove 24 to the maximum groove width position PM.

From the viewpoint that the enlarged width portion 28 can effectively contribute to suppressing a decrease in wet performance, the ratio (HN/DGg) of the groove depth HN from the groove opening 24M of the crown narrow groove 24 to the maximum groove width position PM to the groove depth DGg of the crown narrow groove 24 is preferably not less than 0.75 and not greater than 0.95.

The land ratio of the tire 2 is preferably not less than 80%. Accordingly, the land portions 18 easily support each other as a whole, so that the stiffness of the tread 4 is effectively increased. The tire 2 can effectively reduce rolling resistance and can also improve wear resistance. As described above, the rubber composition for the tread 4 contains silica as a filler. Therefore, there is a concern that the stiffness of the tread 4 may be lower than when the entire filler is composed of carbon black. However, when the land ratio is set to be not less than 80%, the tread 4 can maintain its stiffness to the required degree. In the tire 2, the crown narrow groove 24 and each crown sipe 40 can sufficiently exhibit their functions. The tire 2 can suppress a decrease in wet performance due to wear while reducing rolling resistance. From this viewpoint, the land ratio is more preferably not less than 85%. From the viewpoint of maintaining good wet performance, the land ratio is preferably not greater than 95%.

As shown in FIG. 3, the crown circumferential main groove 14 of the tire 2 includes first peaks 14a closer to the first end TE1 (not shown) of the tread surface 6 and second peaks 14b closer to the second end TE2 of the tread surface 6. The crown circumferential main groove 14 extends in a zigzag manner while passing through the first peaks 14a and the second peaks 14b alternately in the circumferential direction. As described above, the crown circumferential main groove 14 is located on the equator plane CL. In many cases, the crown circumferential main groove 14 is included in a ground-contact surface. A pair of edges 14E forming a groove opening 14M of the crown circumferential main groove 14 each extend in a zigzag manner in the circumferential direction.

Even in the later stage of wear, the crown circumferential main groove 14 can function as an edge component. The crown circumferential main groove 14 can contribute to suppressing a decrease in wet performance due to wear. From this viewpoint, it is preferable that the crown circumferential main groove 14 includes the first peaks 14a closer to the first end TE1 of the tread surface 6 and the second peaks 14b closer to the second end TE2 of the tread surface 6, and extends in a zigzag manner while passing through the first peaks 14a and the second peaks 14b alternately in the circumferential direction.

As shown in FIG. 3, the crown narrow groove 24 extends in the circumferential direction while meandering rather than extending straight. In particular, the crown narrow groove 24 of the tire 2 includes inner crown narrow grooves 56 closer to the equator plane CL, outer crown narrow grooves 58 closer to the end TE of the tread surface 6, and connection crown narrow grooves 60 connecting the inner crown narrow grooves 56 and the outer crown narrow grooves 58.

Among the connection crown narrow grooves 60, the connection crown narrow grooves 60 connecting the inner crown narrow grooves 56 located on the first direction side in the circumferential direction and the outer crown narrow grooves 58 located on the second direction side in the circumferential direction are also referred to as first connection crown narrow grooves 60a. The connection crown narrow grooves 60 connecting the outer crown narrow grooves 58 located on the first direction side in the circumferential direction and the inner crown narrow grooves 56 located on the second direction side in the circumferential direction are also referred to as second connection crown narrow grooves 60b.

When a unit configured by connecting the inner crown narrow groove 56, the first connection crown narrow groove 60a, the outer crown narrow groove 58, and the second connection crown narrow groove 60b in this order is defined as a groove unit, the crown narrow groove 24 is formed by connecting a plurality of such groove units in the circumferential direction. The inner crown narrow grooves 56 and the outer crown narrow grooves 58 are arranged alternately in the circumferential direction.

When a force acts on the crown land portion 20 and the crown land portion 20 is deformed, the wall surfaces of the crown narrow groove 24 come into contact with each other at the body portion main body 32 thereof. Since the crown narrow groove 24 extends in the circumferential direction while meandering, the wall surfaces thereof effectively engage each other. The crown narrow land portions 34 located on both sides of the crown narrow groove 24 constrain each other. The apparent stiffness of the crown land portion 20 is increased. Deformation of the crown land portion 20 is effectively suppressed. The tire 2 can effectively reduce rolling resistance and can also improve wear resistance. As described above, the rubber composition for the tread 4 contains silica as a filler. Therefore, there is a concern that the stiffness of the tread may be lower than when the entire filler is composed of carbon black, but when the crown narrow groove includes inner crown narrow grooves, outer crown narrow grooves, and connection crown narrow grooves, and the inner crown narrow grooves and the outer crown narrow grooves are arranged alternately in the circumferential direction, the tread can maintain its stiffness to the required degree. From this viewpoint, it is preferable that the crown narrow groove 24 includes the inner crown narrow grooves 56, the outer crown narrow grooves 58, and the connection crown narrow grooves 60 connecting the inner crown narrow grooves 56 and the outer crown narrow grooves 58, and the inner crown narrow grooves 56 and the outer crown narrow grooves 58 are arranged alternately in the circumferential direction.

The groove depth DGg of the crown narrow groove 24 of the tire 2 is equal to the groove depth DGc of the crown circumferential main groove 14, or the crown narrow groove 24 is shallower than the crown circumferential main groove 14. As described above, the crown narrow groove 24 has the enlarged width portion 28 on the groove bottom 24T side thereof. The enlarged width portion 28 of the crown narrow groove 24 can effectively contribute to compensating for the reduced groove volume in the later stage of wear. The tire 2 can effectively suppress a decrease in wet performance due to wear.

From this viewpoint, it is preferable that the groove depth DGg of the crown narrow groove 24 is equal to the groove depth DGc of the crown circumferential main groove 14, or the crown narrow groove 24 is shallower than the crown circumferential main groove 14. In other words, the ratio (DGg/DGc) of the groove depth DGg of the crown narrow groove 24 to the groove depth DGc of the crown circumferential main groove 14 is preferably not greater than 1.0

From the viewpoint that the enlarged width portion 28 can effectively contribute to compensating for the reduced groove volume without the entire crown narrow groove 24 disappearing in the later stage of wear, the ratio (DGg/DGc) is preferably not less than 0.75.

The ratio (HH/DGg) of the groove depth HH of the body portion 26 of the crown narrow groove 24 to the groove depth DGg of the crown narrow groove 24 is preferably not less than 0.20 and not greater than 0.50.

When the ratio (HH/DGg) is set to be not less than 0.20, the tire 2 can effectively suppress the influence of the enlarged width portion 28 on the stiffness of the crown land portion 20. The crown narrow groove 24 can effectively contribute to increasing the apparent stiffness of the crown land portion 20. The tire 2 can have further reduced rolling resistance. From this viewpoint, the ratio (HH/DGg) is more preferably not less than 0.25.

When the ratio (HH/DGg) is set to be not greater than 0.50, the enlarged width portion 28 can effectively contribute to compensating for the groove volume reduced due to wear. From this viewpoint, the ratio (HH/DGg) is more preferably not greater than 0.45.

The body portion main body 32 of the crown narrow groove 24 has the groove width WD narrower than the groove width WGc at the groove opening of the crown circumferential main groove 14. As described above, when the tire 2 comes into contact with a road surface and the tread 4 is deformed, the pair of opposing wall surfaces 24W of the crown narrow groove 24 come into contact with each other at the body portion main body 32. The crown narrow land portions 34 adjacent to each other across the crown narrow groove 24 support each other. The crown narrow land portions 34 are formed in the crown portion of the tread portion. When the adjacent crown narrow land portions 34 support each other, the apparent stiffness of the crown portion is increased, and deformation of the crown portion is suppressed. The tire 2 can reduce rolling resistance and can also effectively suppress occurrence of wear of the crown portion. The tire 2 can also improve uneven wear resistance.

From this viewpoint, the ratio (WD/WGc) of the groove width WD of the body portion main body 32 of the crown narrow groove 24 to the groove width WGc of the crown circumferential main groove 14 is preferably not greater than 0.35 and more preferably not greater than 0.20.

From the viewpoint that the crown narrow groove 24 can contribute to drainage and the tire 2 can maintain good wet performance, the ratio (WD/WGc) is preferably not less than 0.01 and more preferably not less than 0.05.

As described above, since the crown sipes 40 are shallower than the crown narrow groove 24, the crown sipes 40 disappear before the crown narrow groove 24. From the viewpoint of being able to reduce the influence of the crown sipes 40 becoming the enlarged width portion 28 of the crown narrow groove 24 on rolling resistance and on wet performance to be smaller, the ratio (DGs/DGg) of the groove depth DGs of each crown sipe 40 to the groove depth DGg of the crown narrow groove 24 is preferably not less than 0.30 and more preferably not less than 0.50. From the same viewpoint, the ratio (DGs/DGg) is preferably not greater than 0.85.

In the tire 2, it is preferable that the crown sipes 40 are deeper than the body portion 26 of the crown narrow groove 24. In other words, it is preferable that the ratio (DGs/DGg) of the groove depth DGs of each crown sipe 40 to the groove depth DGg of the crown narrow groove 24 is larger than the ratio (HH/DGg) of the groove depth HH of the body portion 26 of the crown narrow groove 24 to the groove depth DGg of the crown narrow groove 24. Accordingly, the tire 2 can reduce the influence of the crown sipes 40 becoming the enlarged width portion 28 of the crown narrow groove 24 on rolling resistance and on wet performance to be small. From this viewpoint, it is more preferable that the ratio (DGs/DGg) is larger than the ratio (HH/DGg), the ratio (HH/DGg) is not less than 0.20 and not greater than 0.50, and the ratio (DGs/DGg) is not less than 0.30 and not greater than 0.85.

In the tire 2, it is preferable that the groove bottom 40T of each crown sipe 40 is located radially outward of the maximum groove width position PM of the enlarged width portion 28. Accordingly, the tire 2 can reduce the influence of the crown sipes 40 becoming the enlarged width portion 28 of the crown narrow groove 24 on rolling resistance and on wet performance to be smaller. Even in the later stage of wear, the tire 2 can suppress a decrease in wet performance while maintaining low rolling resistance.

As described above, it is preferable that the crown sipes 40 are deeper than the body portion 26 of the crown narrow groove 24. In other words, it is preferable that the groove bottom 40T of each crown sipe 40 is located radially inward of the body portion 26.

From the viewpoint that, even in the later stage of wear, the tire 2 can suppress a decrease in wet performance while maintaining low rolling resistance, it is more preferable that the groove bottom 40T of each crown sipe 40 is located radially inward of the body portion 26 and located radially outward of the maximum groove width position PM of the enlarged width portion 28.

As shown in FIG. 3, each inner crown sipe 44 of the tire 2 connects the second peak 14b of the crown circumferential main groove 14 and the outer crown narrow groove 58 of the crown narrow groove 24. Each outer crown sipe 48 connects the shoulder circumferential main groove 12 and the inner crown narrow groove 56 of the crown narrow groove 24. As described above, the inner crown narrow grooves 56 and the outer crown narrow grooves 58 are arranged alternately in the circumferential direction. The inner crown sipes 44 and the outer crown sipes 48 are arranged alternately in the circumferential direction.

The inner crown sipes 44 shown in FIG. 3 are inclined with respect to the axial direction. The outer crown sipes 48 are also inclined with respect to the axial direction. The crown sipes 40 are inclined with respect to the axial direction. The crown sipes 40 may extend in the axial direction.

The crown sipes 40 extending in the axial direction or inclined with respect to the axial direction can effectively function as edge components. The tire 2 can have improved wet performance. From this viewpoint, it is preferable that the crown sipes 40 extend in the axial direction or are inclined with respect to the axial direction. It is more preferable that the crown sipes 40 are inclined with respect to the axial direction.

In FIG. 3, an angle θuc represents an angle of the inner crown sipe 44 with respect to the axial direction. The angle θuc is also referred to as inclination angle of the inner crown sipe 44. An angle θsc represents an angle of the outer crown sipe 48 with respect to the axial direction. The angle θsc is also referred to as inclination angle of the outer crown sipe 48.

From the viewpoint that the inner crown sipe 44 can effectively function as an edge component, the inclination angle θuc of the inner crown sipe 44 is preferably not less than 0 degrees and more preferably not less than 5 degrees. From the same viewpoint, the inclination angle θuc is preferably not greater than 45 degrees.

From the viewpoint that the outer crown sipe 48 can effectively function as an edge component, the inclination angle θsc of the outer crown sipe 48 is preferably not less than 0 degrees and more preferably not less than 5 degrees. From the same viewpoint, the inclination angle θsc is preferably not greater than 45 degrees.

As shown in FIG. 3, the ends of the inner crown sipes 44 on the end TE side of the tread surface 6 are located on the second direction side in the circumferential direction with respect to the ends of the inner crown sipes 44 on the equator plane CL side. The ends of the outer crown sipes 48 on the end TE side of the tread surface 6 are located on the first direction side in the circumferential direction with respect to the ends of the outer crown sipes 48 on the equator plane CL side. The direction of inclination of the inner crown sipes 44 is opposite to the direction of inclination of the outer crown sipes 48.

In the tire 2, when a force acts on the crown land portion 20 from the equator plane CL side toward the end TE of the tread surface 6, the wall surfaces of each outer crown sipe 48 come into contact with and support each other. The outer crown narrow land portion 38 can effectively restrict the movement of the inner crown narrow land portion 36. Accordingly, the apparent stiffness of the crown land portion 20 is increased. When a force acts on the crown land portion 20 from the end TE side of the tread surface 6 toward the equator plane CL, the wall surfaces of each inner crown sipe 44 come into contact with and support each other. The inner crown narrow land portion 36 can effectively restrict the movement of the outer crown narrow land portion 38. In this case as well, the apparent stiffness of the crown land portion 20 is increased. In both cases, deformation of the crown land portion 20 is effectively suppressed. The tire 2 can have further reduced rolling resistance. From this viewpoint, it is preferable that the direction of inclination of the crown sipes 40 on the inner crown narrow land portion 36 is opposite to the direction of inclination of the crown sipes 40 on the outer crown narrow land portion 38.

From the viewpoint of being able to effectively suppress a decrease in wet performance due to wear while reducing rolling resistance, it is more preferable that the crown sipes 40 provided on each of the two crown narrow land portions 34 are inclined with respect to the axial direction, the direction of inclination of the inner crown sipes 44 is opposite to the direction of inclination of the outer crown sipes 48, each inner crown sipe 44 connects the second peak 14b of the crown circumferential main groove 14 and the outer crown narrow groove 58 of the crown narrow groove 24, and each outer crown sipe 48 connects the inner crown narrow groove 56 of the crown narrow groove 24 and the shoulder circumferential main groove 12.

Figure 6:
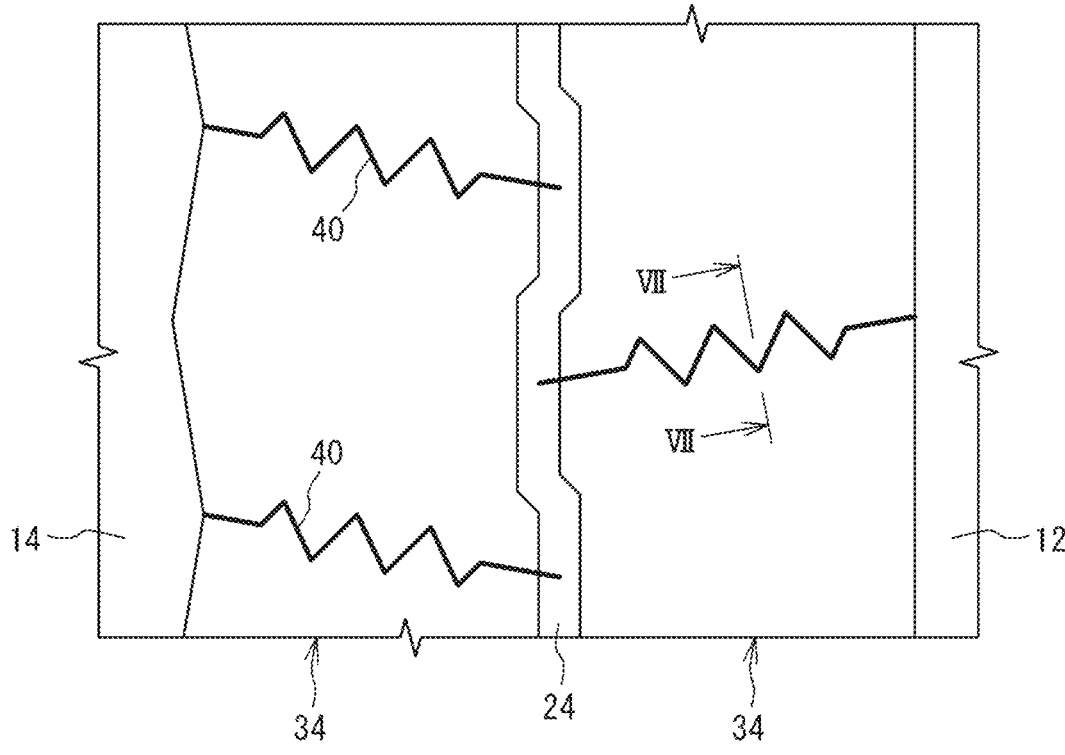
FIG. 6 is a development view showing a modification of a crown sipe.
Figure 7:
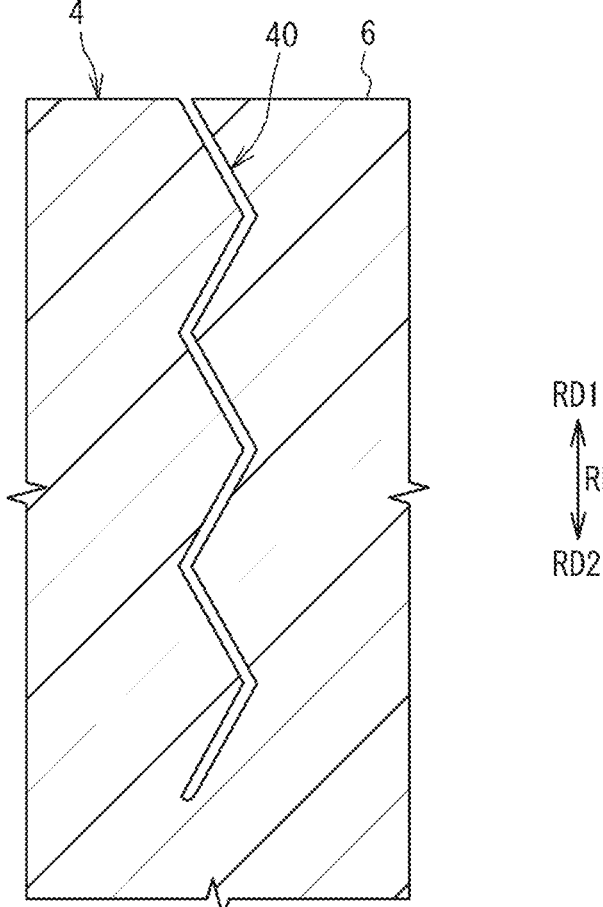
FIG. 7 is a cross-sectional view taken along a line VII-VII in FIG. 6.

FIG. 6 and FIG. 7 show a modification of the crown sipe 40. FIG. 7 represents a cross-section of the crown sipe 40 along a line VII-VII in FIG. 6.

As shown in FIG. 6, the crown sipe 40 extends in a zigzag manner in the longitudinal direction thereof. As shown in FIG. 7, the crown sipe 40 also extends in a zigzag manner in the depth direction thereof. The crown sipe 40 extends in a zigzag manner in the longitudinal direction and the depth direction thereof. The amplitude of the zigzag is preferably not less than 0.5 mm and not greater than 3.0 mm.

The crown sipe 40 is a three-dimensional sipe. When the tread is deformed and the wall surfaces of the crown sipe come into close contact with each other, the wall surfaces constrain each other, so that the stiffness of the tread is effectively increased. The tire can effectively reduce rolling resistance and can also improve wear resistance. As described above, the rubber composition for the tread 4 contains silica as a filler. Therefore, there is a concern that the stiffness of the tread may be lower than when the entire filler is composed of carbon black. However, when each crown sipe 40 is composed of a three-dimensional sipe extending in a zigzag manner in the longitudinal direction and the depth direction thereof, the tread 4 can maintain its stiffness to the required degree. From this viewpoint, it is preferable that each crown sipe 40 extends in a zigzag manner in the longitudinal direction and the depth direction thereof.

Figure 8:
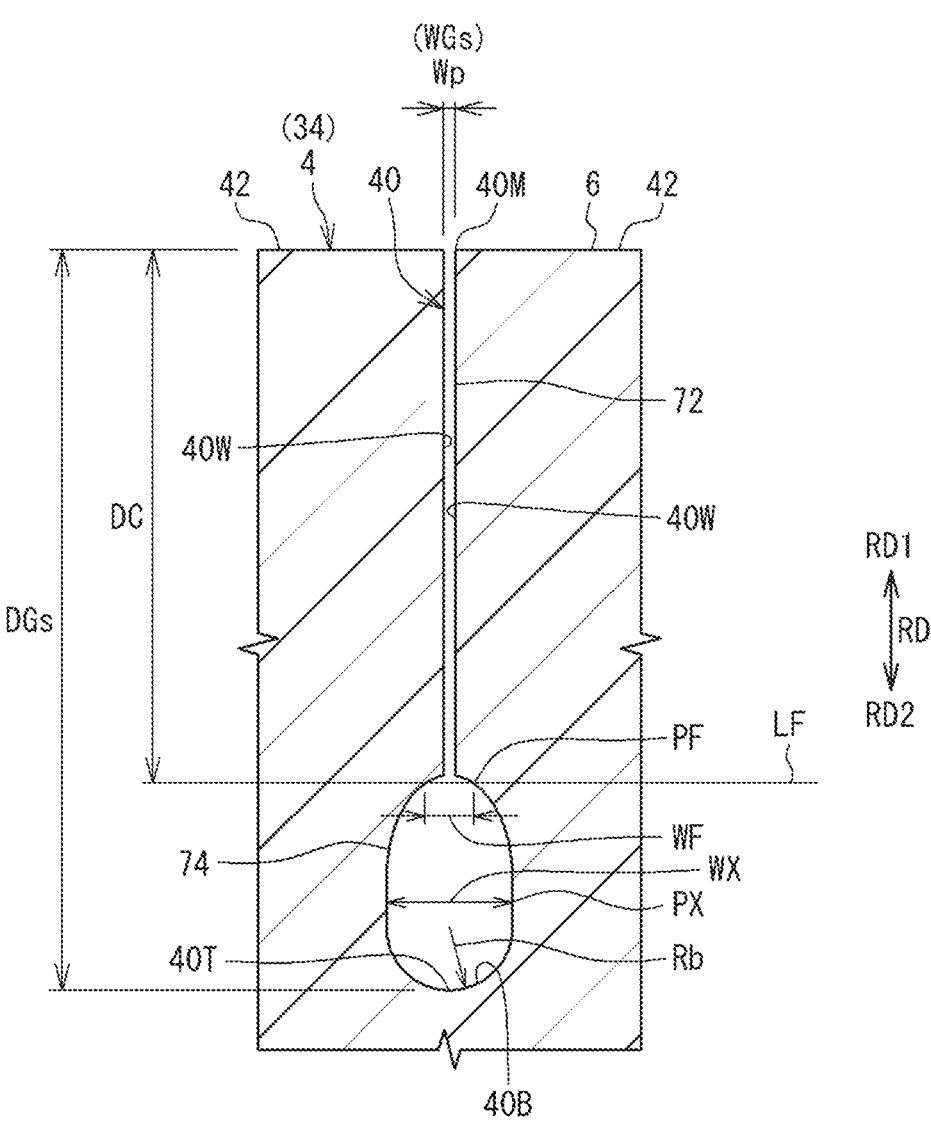
FIG. 8 is a cross-sectional view showing another modification of the crown sipe.

FIG. 8 shows another modification of the crown sipe 40.

The crown sipe 40 has a sipe body 72 and a tubular portion 74. The sipe body 72 includes the groove opening 40M of the crown sipe 40. The tubular portion 74 includes the groove bottom 40T of the crown sipe 40.

Although not shown, the sipe body 72 extends straight in the longitudinal direction of the crown sipe 40 as in the crown sipes 40 shown in FIG. 3. As shown in FIG. 8, the sipe body 72 extends straight in the depth direction of the crown sipe 40. In FIG. 8, a length indicated by a double-headed arrow Wp is the groove width of the sipe body 72. The groove width Wp of the sipe body 72 is also the groove width WGs at the groove opening 40M of the crown sipe 40.

The tubular portion 74 is located radially inward of the sipe body 72. The tubular portion 74 extends in the longitudinal direction of the crown sipe 40.

In FIG. 8, a solid line LF is a boundary line between the sipe body 72 and the tubular portion 74. A length indicated by a double-headed arrow WF is the groove width of the crown sipe 40 measured along the boundary line LF. The boundary line LF is set at a position at which the groove width WF is 1.0 mm.

The groove width Wp of a portion outside the boundary line LF, that is, the sipe body 72, is less than 1.0 mm. The groove width of a portion inside the boundary line LF, that is, the tubular portion 74, is not less than 1.0 mm. The groove width of the tubular portion 74 is wider than the groove width of the sipe body 72.

The tubular portion 74 extends inward from the position of the boundary line LF. In FIG. 8, a length indicated by a double-headed arrow WX is the maximum groove width of the tubular portion 74. In FIG. 8, a position indicated by reference sign PX is the position at which the tubular portion 74 has the maximum groove width WX. The tubular portion 74 is tapered outward from a portion where the tubular portion 74 has the maximum groove width WX. The tubular portion 74 is tapered inward from the portion where tubular portion 74 has the maximum groove width WX.

A cross-sectional shape of the tubular portion 74 may be circular or elliptical. This cross-sectional shape may be a shape in which the portion where the tubular portion 74 has the maximum groove width WX is represented by a straight line and the sipe body 72 side and the groove bottom 40T side of the straight line portion are represented by arcs (hereinafter, this shape is also referred to as track shape).

The sipe body 72 can function as an edge component. The sipe body 72 can contribute to suppressing a decrease in wet performance. As described above, the groove width Wp of the sipe body 72 is less than 1.0 mm. When a load acts on the crown narrow land portion 34 and the crown narrow land portion 34 is deformed, the wall surfaces 40W of the crown sipe 40 come into contact with each other and support each other. The sipe body 72 can also contribute to reduction of rolling resistance. The tubular portion 74 is exposed when the sipe body 72 disappears. The tubular portion 74 has a wide groove width. After the sipe body 72 disappears, the tubular portion 74 can contribute to maintaining wet performance.

The maximum groove width WX of the tubular portion 74 is preferably not less than four times and more preferably not less than five times the groove width Wp of the sipe body 72. Accordingly, the tubular portion 74 can contribute to maintaining wet performance. The maximum groove width WX of the tubular portion 74 is preferably not greater than 13 times and more preferably not greater than 12 times the groove width Wp of the sipe body 72. Accordingly, the size of the tubular portion 74 is appropriately maintained. A decrease in the stiffness of the crown narrow land portion 34 is suppressed.

As described above, the tubular portion 74 includes the bottom surface 40B including the groove bottom 40T of the crown sipe 40. In the cross-section shown in FIG. 8, the contour of the bottom surface 40B of the tubular portion 74 is represented by an arc passing through the groove bottom 40T. In FIG. 8, an arrow Rb indicates the radius of this arc.

The radius Rb of the arc representing the contour of the bottom surface 40B of the tubular portion 74 is preferably not less than 1.5 mm and not greater than 3.5 mm.

When the radius Rb is set to be not less than 1.5 mm, occurrence of cracking at the groove bottom 40T is effectively suppressed. From this viewpoint, the radius Rb is more preferably not less than 2.0 mm.

When the radius Rb is set to be not greater than 3.5 mm, a decrease in the stiffness of the crown block 42 due to the tubular portion 74 being provided in the crown sipe 40 is suppressed. The stiffness of the crown block 42 is appropriately maintained. The tire 2 can improve uneven wear resistance. From this viewpoint, the radius Rb is more preferably not greater than 3.0 mm.

In FIG. 8, a length indicated by a double-headed arrow DC is the groove depth of the sipe body 72. The groove depth DC, in other words, the position of the boundary line LF, is determined as appropriate in consideration of the specifications of the tire 2.

The ratio (DC/DGs) of the groove depth DC of the sipe body 72 of the crown sipe 40 to the groove depth DGs of the crown sipe 40 is preferably not less than 0.35 and not greater than 0.80.

When the ratio (DC/DGs) is set to be not less than 0.35, the tire 2 can expose the tubular portion 74 at an appropriate timing. The tire 2 can allow wear of the tread 4 to proceed while maintaining the stiffness of the crown blocks 42. The tire 2 can maintain good uneven wear resistance. From this viewpoint, the ratio (DC/DGs) is more preferably not less than 0.40.

When the ratio (DC/DGs) is set to be not greater than 0.80, the tubular portion 74 can effectively contribute to improving appearance quality and exhibiting traction performance. From this viewpoint, the ratio (DC/DGs) is more preferably not greater than 0.75.

Figure 9:
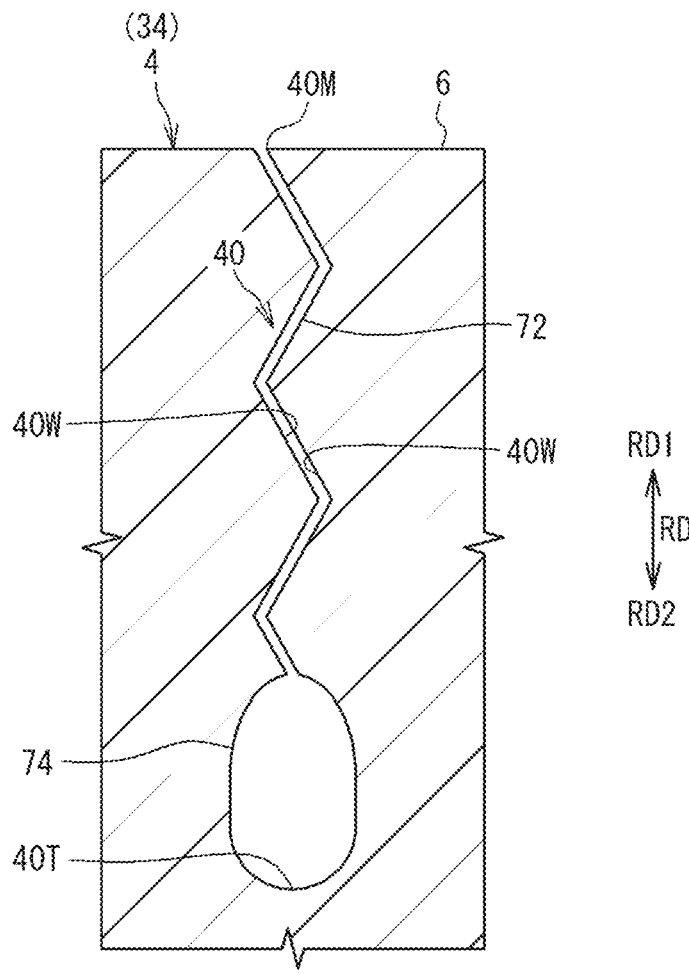
FIG. 9 is a cross-sectional view showing still another modification of the crown sipe.

FIG. 9 shows still another modification of the crown sipe 40. As shown in FIG. 9, the sipe body 72 shown in FIG. 8 may be composed of a three-dimensional sipe as in the crown sipe 40 shown in FIG. 7. In this case, when the crown narrow land portion 34 is deformed and the wall surfaces 40W of the crown sipe 40 come into contact with each other, both wall surfaces 40W are in sufficiently close contact with each other. Deformation of the crown narrow land portion 34 is effectively suppressed.

As is obvious from the above description, according to the present invention, a heavy duty tire that can suppress a decrease in wet performance due to wear while reducing rolling resistance, is obtained.

Examples

The following will describe the present invention in further detail by means of examples, etc., but the present invention is not limited to these examples.

Various chemicals used in Examples and Comparative Examples are described below.

NR: TSR20

SBR: HPR840 (S-SBR, styrene content: 10% by mass, vinyl content: 42% by mole, Tg: −60° C., Mw: 190 thousand) manufactured by JSR Corporation BR: UBEPOL BR (registered trademark) 150B (cis content: 97% by mole) manufactured by Ube Industries, Ltd.

Carbon black 1: DIABLACK N134 ($N_2SA$: 148 $m^2/g$) manufactured by Mitsubishi Chemical Corporation Carbon black 2: SS550 (carbon black obtained from the pyrolysis process of tires) manufactured by Strebl Green Carbon Pte Ltd.

Silica 1: ULTRASIL 9100GR ($N_2SA$: 230 $m^2/g$, average primary particle diameter: 15 nm) manufactured by Evonik Degussa GmbH Silica 2: K185 (amorphous silica refined from rice husks) manufactured by Wilmar Silane coupling agent: Si266 (bis(3-triethoxysilylpropyl) disulfide) manufactured by Evonik Degussa GmbH Resin component: Oppera PR-383 (hydrogenated DCPD/C9 resin, resin containing dicyclopentadiene, styrene, and indene as monomer components, softening point: 103° C.) manufactured by Exxon Mobil Corporation Wax: OZOACE-0355 manufactured by NIPPON SEIRO CO., LTD.

Antioxidant 1: NOCRAC 6C (N-(1,3-dimethylbutyl)-N'-phenyl-p-phenylenediamine) manufactured by OUCHI SHINKO CHEMICAL INDUSTRIAL CO., LTD.

Antioxidant 2: NOCRAC RD (poly(2,2,4-trimethyl-1,2-dihydroquinoline)) manufactured by OUCHI SHINKO CHEMICAL INDUSTRIAL CO., LTD.

Stearic acid: bead stearic acid, Tsubaki, manufactured by NOF Corporation

Zinc oxide: Zinc Oxide Type-1 manufactured by Mitsui Mining & Smelting Co., Ltd.

Sulfur: HK-200-5 (powdery sulfur containing 5% of oil) manufactured by Hosoi Chemical Industry Co., Ltd.

Vulcanization accelerator: NOCCELER NS (N-t-butyl-2-benzothiazole sulfenamide) manufactured by OUCHI SHINKO CHEMICAL INDUSTRIAL CO., LTD.

Examples and Comparative Examples

In accordance with each blending formula shown in Tables 1 to 3, materials other than sulfur and a vulcanization accelerator are kneaded under a condition of 150° C. for 5 minutes by using a 1.7-L Banbury mixer manufactured by Kobe Steel, Ltd., to obtain a kneaded product. Next, the sulfur and the vulcanization accelerator are added to the obtained kneaded product, and the mixture is kneaded under a condition of 80° C. for 5 minutes by using an open roll, to obtain a rubber composition (uncrosslinked rubber composition). The obtained rubber composition is molded into a tread and attached together with other parts such as sidewalls to form an unvulcanized tire. The unvulcanized tire is press-vulcanized under a condition of 150° C. for 12 minutes to produce a test tire (size: 315/70R22.5, tire for trucks and buses). The tread pattern shown in FIG. 1 is used as the tread pattern of the test tire.

[Preparation Before Evaluation]

Buffing is performed on the tread of each test tire. Specifically, the tread is buffed until a state where the body portion main body of each crown narrow groove and each crown sipe disappeared and each enlarged width portion remained on the tread surface. Accordingly, the later stage of wear is reproduced.

Tables 1 to 3 show the calculation results based on the following evaluation methods for the test tires in which the later stage of wear is reproduced by buffing.

[Rolling Resistance (RRC)]

Using a rolling resistance testing machine, a rolling resistance coefficient (RRC) is measured when each test tire in which the later stage of wear is reproduced ran on a drum at a speed of 80 km/h under the following conditions. The reciprocals of the measured values of Example 1 and Comparative Examples 1 and 2 are represented as indexes with that of Comparative Example 2 as 100. The reciprocals of the measured values of Examples 2 and 3 and Comparative Examples 3 and 4 are represented as indexes with that of Comparative Example 4 as 100. The reciprocals of the measured values of Examples 4 and 5 and Comparative Examples 5 and 6 are represented as indexes with that of Comparative Example 6 as 100.

The results are shown in the cells for "RRC" in Tables 1 to 3 below. The higher the value is, the lower the rolling resistance of the tire is.

Rim: 9.00×22.5

Internal pressure: 900 kPa

Vertical load: 33.35 kN

[Wet Performance (WET)]

Wet performance (wet braking performance) is tested in accordance with R117-02 (ECE Regulation, No. 117, Revi-

1

US 12,643,348 B2

37 sion 2) using a test vehicle described below. Test tires in which the later stage of wear is reproduced are mounted to all wheels of the test vehicle. As to wet performance, a braking distance that the test vehicle traveled on a wet road surface from the start of braking at a predetermined initial speed until the test vehicle stopped is measured.

Test vehicle: truck with a load capacity of 10 t (2-D vehicle)

Load: 75% of the standard load weight

Wet road surface: water depth of 0.5 to 2 mm

Speed: 65 km/h

The measured values of Example 1 and Comparative Examples 1 and 2 are represented as indexes with that of Comparative Example 2 as 100 by the following equation.

(Wet performance index) =

(braking distance of tire of Comparative Example 2)

/(braking distance of each test tire) × 100

The measured values of Examples 2 and 3 and Comparative Examples 3 and 4 are represented as indexes with that of Comparative Example 4 as 100 by the following equation.

(Wet performance index) =

(braking distance of tire of Comparative Example 4)

/(braking distance of each test tire) × 100

The measured values of Examples 4 and 5 and Comparative Examples 5 and 6 are represented as indexes with that of Comparative Example 6 as 100 by the following equation.

(Wet performance index) =

(braking distance of tire of Comparative Example 6)

/(braking distance of each test tire) × 100

The results are shown in the cells for "WET" in Tables 1 to 3 below. The higher the value is, the better the wet performance is.

TABLE 1

| Blending formula (parts by mass) | Ex. 1 | Comp. Ex. 1 | Comp. Ex. 2 |
|---|---|---|---|
| NR | 60 | 100 | 100 |
| SBR | 20 | — | — |
| BR | 20 | — | — |
| CB1 | 35 | 55 | 35 |
| CB2 | — | — | — |
| Silica 1 | 25 | 5 | 25 |
| Silica 2 | — | — | — |
| Coupling agent | 2.5 | — | 2.5 |
| Resin | 3 | 3 | 3 |
| Wax | 1.5 | 1.5 | 1.5 |
| Antioxidant 1 | 1 | 1 | 1 |
| Antioxidant 2 | 1 | 1 | 1 |
| Stearic acid | 3 | 3 | 3 |
| Zinc oxide | 3 | 3 | 3 |
| Sulfur | 1.5 | 1.5 | 1.5 |
| Vulcanization accelerator | 2 | 1.5 | 2 |
| Amount CSB [parts by mass] | 20 | 0 | 0 |

38

TABLE 1-continued

| Blending formula (parts by mass) | Ex. 1 | Comp. Ex. 1 | Comp. Ex. 2 |
|---|---|---|---|
| Amount BS [parts by mass] | 25 | 5 | 25 |
| Amount CS [parts by mass] | 42 | 8 | 42 |
| DGg − DGs [mm] | 3.5 | 3.5 | 3.5 |
| (CSB + BS)/(DGg − DGs) | 12.9 | 1.4 | 7.1 |
| RRC | 120 | 85 | 100 |
| WET | 120 | 85 | 100 |

TABLE 2

| Blending formula (parts by mass) | Ex. 2 | Ex. 3 | Comp. Ex. 3 | Comp. Ex. 4 |
|---|---|---|---|---|
| NR | 50 | 50 | 100 | 100 |
| SBR | 50 | 50 | — | — |
| BR | — | — | — | — |
| CB1 | 60 | 60 | 70 | 60 |
| CB2 | — | — | — | — |
| Silica 1 | 15 | — | 5 | 15 |
| Silica 2 | — | 15 | — | — |
| Coupling agent | 1.5 | 1.5 | — | 1.5 |
| Resin | 3 | 3 | 3 | 3 |
| Wax | 1.5 | 1.5 | 1.5 | 1.5 |
| Antioxidant 1 | 1 | 1 | 1 | 1 |
| Antioxidant 2 | 1 | 1 | 1 | 1 |
| Stearic acid | 3 | 3 | 3 | 3 |
| Zinc oxide | 3 | 3 | 3 | 3 |
| Sulfur | 1.5 | 1.5 | 1.5 | 1.5 |
| Vulcanization accelerator | 2 | 2 | 1.5 | 2 |
| Amount CSB [parts by mass] | 50 | 50 | 0 | 0 |
| Amount BS [parts by mass] | 15 | 15 | 5 | 15 |
| Amount CS [parts by mass] | 20 | 20 | 7 | 20 |
| DGg − DGs [mm] | 3.5 | 3.5 | 3.5 | 3.5 |
| (CSB + BS)/(DGg − DGs) | 18.6 | 18.6 | 1.4 | 4.3 |
| RRC | 115 | 115 | 90 | 100 |
| WET | 125 | 125 | 90 | 100 |

TABLE 3

| Blending formula (parts by mass) | Ex. 4 | Ex. 5 | Comp. Ex. 5 | Comp. Ex. 6 |
|---|---|---|---|---|
| NR | 40 | 40 | 100 | 100 |
| SBR | 30 | 30 | — | — |
| BR | 30 | 30 | — | — |
| CB1 | 5 | — | 65 | 5 |
| CB2 | — | 5 | — | — |
| Silica 1 | 65 | 65 | 5 | 65 |
| Silica 2 | — | — | — | — |
| Coupling agent | 6.5 | 6.5 | — | 6.5 |
| Resin | — | — | — | — |
| Wax | 1.5 | 1.5 | 1.5 | 1.5 |
| Antioxidant 1 | 1 | 1 | 1 | 1 |
| Antioxidant 2 | 1 | 1 | 1 | 1 |
| Stearic acid | 3 | 3 | 3 | 3 |
| Zinc oxide | 3 | 3 | 3 | 3 |
| Sulfur | 1.5 | 1.5 | 1.5 | 1.5 |
| Vulcanization accelerator | 2 | 2 | 1.5 | 2 |
| Amount CSB [parts by mass] | 30 | 30 | 0 | 0 |
| Amount BS [parts by mass] | 65 | 65 | 5 | 65 |
| Amount CS [parts by mass] | 93 | 93 | 7 | 93 |
| DGg − DGs [mm] | 3.5 | 3.5 | 3.5 | 3.5 |
| (CSB + BS)/(DGg − DGs) | 27.1 | 27.1 | 1.4 | 18.6 |
| RRC | 110 | 110 | 85 | 100 |
| WET | 130 | 130 | 85 | 100 |

INDUSTRIAL APPLICABILITY

The above-described technology capable of suppressing a decrease in wet performance due to wear while reducing rolling resistance can be applied to various tires.

REFERENCE SIGNS LIST 2 tire
4 tread
6 tread surface
10 circumferential main groove
12 shoulder circumferential main groove
14 crown circumferential main groove
18 land portion
20 crown land portion
22 shoulder land portion
24 crown narrow groove
26 body portion of crown narrow groove 24
28 enlarged width portion of crown narrow groove 24
30 tapered portion of body portion 26
32 body portion main body of body portion 26
34 crown narrow land portion
36 inner crown narrow land portion
38 outer crown narrow land portion
40 crown sipe
42 crown block
44 inner crown sipe
48 outer crown sipe
56 inner crown narrow groove
58 outer crown narrow groove

The invention claimed is:

1. A heavy duty tire comprising a tread formed from a rubber composition comprising:

a rubber component including a styrene butadiene rubber; and a filler including silica, wherein the tread has a tread surface configured to come into contact with a road surface, the tread has a plurality of circumferential main grooves extending continuously in a circumferential direction, the plurality of circumferential main grooves include a crown circumferential main groove located on an equator plane and a pair of shoulder circumferential main grooves located on outermost sides in an axial direction, the plurality of circumferential main grooves define a plurality of land portions in the tread, the plurality of land portions include a pair of crown land portions closest to the equator plane and a pair of shoulder land portions including ends of the tread surface, each of the crown land portions has a crown narrow groove extending continuously in the circumferential direction, the crown narrow groove defines two crown narrow land portions in the crown land portion, each of the crown narrow land portions has crown sipes traversing the crown narrow land portion, the crown narrow groove includes a body portion main body and an enlarged width portion located radially inward of the body portion main body, opposing wall surfaces of the body portion main body are brought into contact with each other by deformation of the tread, a groove width of the enlarged width portion is wider than a groove width of the body portion main body, the enlarged width portion includes an inflection portion and a bottom portion, the bottom portion is located radially inward of the inflection portion, a contour of the inflection portion is represented by an arc, a contour of the bottom portion is represented by an arc, a radius Rc of the arc representing the contour of the inflection portion is larger than a radius Rt of the arc representing the contour of the bottom portion, a groove depth DGs of each crown sipe is shallower than a groove depth DGg of the crown narrow groove, an amount CSB of the styrene butadiene rubber in 100 parts by mass of the rubber component is not less than 10 parts by mass, an amount BS of the silica per 100 parts by mass of the rubber component is not less than 15 parts by mass, and the amount CSB of the styrene butadiene rubber, the amount BS of the silica, the groove depth DGs (mm) of each crown sipe, and the groove depth DGg (mm) of the crown narrow groove satisfy the following relational expression:

$$(CSB + BS)/(DGg - DGs) \geq 5.$$

2. The heavy duty tire according to claim 1, wherein the rubber component further includes a natural rubber and a butadiene rubber, and the amount CSB of the styrene butadiene rubber, an amount CN of the natural rubber, and an amount CB of the butadiene rubber in 100 parts by mass of the rubber component satisfy the following relational expression:

$$CN \geq CSB + CB.$$

3. The heavy duty tire according to claim 1, wherein an amount CS of the silica in 100 parts by mass of the filler is not less than 40 parts by mass.

4. The heavy duty tire according to claim 1, wherein the silica includes silica made from a biomass material.

5. The heavy duty tire according to claim 1, wherein the filler includes silica having an average primary particle diameter of not greater than 16 nm.

6. The heavy duty tire according to claim 1, wherein the filler further includes carbon black, and the carbon black includes recycled carbon black.

7. The heavy duty tire according to claim 1, wherein the filler further includes carbon black, and the carbon black includes carbon black having an average primary particle diameter of not greater than 19 nm.

8. The heavy duty tire according to claim 1, wherein the rubber composition further comprises a resin component.

9. The heavy duty tire according to claim 1, wherein a land ratio is not less than 80%, the land ratio being a ratio of a total area value of ground-contact surfaces of a plurality of land portions included in a ground-contact surface to an area value of an entirety of the ground-contact surface, the ground-contact surface being obtained by applying a load, which is 100% of a normal load, to the tire, which is fitted on a normal rim and whose internal pressure is adjusted to a normal internal pressure, with a camber angle as 0 degrees, and bringing the tire into contact with a flat road surface.

10. The heavy duty tire according to claim 1, wherein each crown sipe extends in a zigzag manner in a longitudinal direction and a depth direction thereof.

11. The heavy duty tire according to claim 1, wherein the crown narrow groove includes inner crown narrow grooves close to the equator plane, outer crown narrow grooves close to the end of the tread surface, and connection crown narrow grooves connecting the inner crown narrow grooves and the outer crown narrow grooves, and the inner crown narrow grooves and the outer crown narrow grooves are arranged alternately in the circumferential direction.

12. The heavy duty tire according to claim 1, wherein a styrene content of the styrene butadiene rubber is not less than 5% by mass and not greater than 24% by mass.

13. The heavy duty tire according to claim 1, wherein a vinyl content of the styrene butadiene rubber is not less than 26% by mole.

14. The heavy duty tire according to claim 1, wherein the each crown sipe is deeper than a groove depth from a groove opening of the crown narrow groove to a boundary between the body portion main body and the enlarged width portion.

15. The heavy duty tire according to claim 1, wherein a groove bottom of each crown sipe is located radially outward of a maximum groove width position of the enlarged width portion.

16. The heavy duty tire according to claim 1, wherein the inflection portion is curved so as to be recessed inward from the outer side thereof, and the bottom portion is curved so as to bulge outward from an inner side thereof.

17. The heavy duty tire according to claim 1, wherein the inflection portion is curved so as to be recessed inward from the outer side thereof, the bottom portion is curved so as to bulge outward from an inner side thereof, and a ratio Rc/Rt of the radius Rc of the arc representing the contour of the inflection portion to the radius Rt of the arc representing the contour of the bottom portion is not less than 1.5 and not greater than 20.

18. The heavy duty tire according to claim 1, wherein the bottom portion includes a maximum groove width position of the enlarged width portion.

19. The heavy duty tire according to claim 1, wherein the two crown narrow land portions are an inner crown narrow land portion closer to the equator plane and an outer crown narrow land portion closer to an end of the tread surface, each of the inner crown narrow land portion and the outer crown narrow land portion has the crown sipes, and the crown sipes of the inner crown narrow land portion and the crown sipes of the outer crown narrow land portion are discontinuous and staggered relative to one another.

\* \* \* \* \*